US 6,718,103 B2

(12) United States Patent
Cruz

(10) Patent No.: US 6,718,103 B2
(45) Date of Patent: Apr. 6, 2004

(54) APPARATUS AND METHOD FOR TRANSMITTING IMAGES OVER A SINGLE-FILAMENT FIBER OPTIC CABLE

(75) Inventor: Aluizio M. Cruz, Paramount, CA (US)

(73) Assignee: Vertical Computer Systems, Inc., Los Angeles, CA (US)

(*) Notice: Subject to any disclaimer, the term of this patent is extended or adjusted under 35 U.S.C. 154(b) by 307 days.

(21) Appl. No.: 09/884,522

(22) Filed: Jun. 18, 2001

(65) Prior Publication Data

US 2002/0025114 A1 Feb. 28, 2002

Related U.S. Application Data

(63) Continuation-in-part of application No. 09/550,629, filed on Apr. 17, 2000, now abandoned.

(51) Int. Cl.$^7$ ................................................ G02B 6/00
(52) U.S. Cl. ...................... 385/116; 362/385; 354/219; 385/147
(58) Field of Search ................................. 385/116, 117, 385/147, 901; 362/385; 354/219; 351/205, 214–215, 221, 246, 200

(56) References Cited

U.S. PATENT DOCUMENTS

| | | | |
|---|---|---|---|
| 1,610,423 A | | 12/1926 | Cawley |
| 1,751,584 A | | 3/1930 | Hansell |
| 2,825,260 A | | 3/1958 | O'Brien ........................... 88/1 |
| 3,016,785 A | * | 1/1962 | Kapany ....................... 385/116 |
| 4,387,594 A | | 6/1983 | Berthold |
| 4,461,974 A | | 7/1984 | Chiu |
| 4,756,615 A | | 7/1988 | Hildebrand |
| 4,963,906 A | * | 10/1990 | Goodman .................... 396/374 |
| 5,208,891 A | | 5/1993 | Prysner ....................... 385/116 |
| 5,363,838 A | | 11/1994 | George ........................... 128/6 |
| 6,065,837 A | * | 5/2000 | Goldfain et al. ............. 351/205 |
| 6,527,390 B2 | * | 3/2003 | Goldfain et al. ............. 351/200 |

OTHER PUBLICATIONS

Bohm, David, "Wholeness and the Implicate Order," pp. 122–127 (1982), (no date).
Brown, Earle B., "Modern Optics," pp. 192–193, 528–31 (Oct. 1966), (no date).
Kahn, Joseph M. et al., "A Bottleneck for Optical Fibres," Nature, pp. 1007, 1008–10 (Jun. 28, 2001).
Lightreading.com Website Printout, Physicists Find Fiber's Limit, dated Jun. 29, 2001.
Mitra, Partha P. et al., "Nonlinear Limits to the Information Capacity of Optical Fiber Communications," Nature, pp. 1027–1030 (Jun. 28, 2001).
Nanoptics.com Website Printout, "Fiberoptic Tutorial," dated Sep. 9, 2000.
Ronchi, Vasco. "Optics: The Science of Vision," pp. 18–21, 265–267 (1957), (no date).

* cited by examiner

*Primary Examiner*—Akm Enayet Ullah
(74) *Attorney, Agent, or Firm*—Brown Raysman Millstein Felder & Steiner LLP

(57) ABSTRACT

A system for transmitting images and methods of manufacturing and using the same. The system for transmitting images includes a camera, a fiber optic cable, and a display system. The camera comprises a lens system for receiving light signals from one or more still and/or moving objects to be imaged. Upon receiving the light signals, the lens system intensifies the light signals to produce a substantially-reduced image of the objects and communicates the entire substantially-reduced image in real-time to a lens system of the display system via a single filament of the fiber optic cable. The lens system of the display system then deminiaturizes (or magnifies) the substantially-reduced image to produce an expanded image of the objects. The expanded image, which is continuously updated by the lens system of the camera to generate real-time still and/or moving images, is visibly presented by the display system.

46 Claims, 9 Drawing Sheets

APPARATUS AND METHOD FOR TRANSMITTING IMAGES OVER A SINGLE-FILAMENT FIBER OPTIC CABLE

CROSS-REFERENCE TO RELATED APPLICATIONS

This application is a continuation-in-part of U.S. patent application Ser. No. 09/550,629, filed on Apr. 17, 2000, now abandoned. The priority of this prior application is expressly claimed and its disclosure is hereby incorporated by reference in its entirety.

BACKGROUND OF THE INVENTION

1. Field of the Invention

The present invention relates generally to optical imaging systems and, more particularly, to a system and method for transmitting entire images over a single filament of a fiber optic cable.

2. Background of the Invention

It has been known since the late 1920s that light can be transmitted through transparent conductors as described in U.S. Pat. No. 1,751,584, issued to Hansell. Later, in the 1950s, as disclosed in U.S. Pat. No. 2,825,260, issued to O'Brien, a plurality of transparent conductors, or filaments, were formed as long, thin rods, individually coated with an opaque material, and grouped into a bundle for transporting images. It was recognized that the size of the bundle of filaments depends upon the purpose for which the bundle would be used and that the cross-sectional size of the filament, in turn, depends upon the degree of resolution desired in the images. The fiber bundle was later refined as described in U.S. Pat. No. 3,016,785, issued to Kapany. This refinement included the use of flexible bundles and the use of motion in conjunction with a larger number of filaments each with a smaller diameter to further increase image resolution.

Over the past few years, fiber optic cables have been used in a growing number of applications to communicate information. In many of these applications, fiber optic cable has become a preferred medium of communication over standard metal cable because fiber optic cable has many advantages over metal cable. For example, operating at higher speeds and having a much greater bandwidth, fiber optic cable can carry more information than can metal cable. This information can span longer distances without being refreshed when communicated over fiber optic cable. Also, relative to metal cable, fiber optic cable has a greater resistance to electromagnetic noise and a much lower cost to maintain. Fiber optic cable further is much thinner and lighter than metal cable.

For example, fiber optic cables are used to transmit images in many modern imaging systems. These fiber optic cables typically comprise a fiber bundle with a large number of individual filaments. According to the traditional understanding in the art, the fiber bundle must have a large number of individual filaments, preferably maintained in relative position at both ends of the bundle, because the resolution of the transmitted images is substantially proportional to a number of filaments per unit cross-sectional area of the fiber bundle. Thus, image resolution increases as the number of filaments per unit cross-sectional area of the fiber bundle also increases. For the number of filaments per unit cross-sectional area of the fiber bundle to increase, however, a diameter of each filament must become smaller. Such filaments, due to their small diameters, have proven to be difficult and expensive to produce under current manufacturing processes. In use, filaments with small diameters also have proven to be fragile and have resulted in deterioration in image quality because of signal loss within individual filaments and crosstalk between filaments.

An illustrative imaging system is described in U.S. Pat. No. 5,208,891, issued to Prysner. Noting that optical images can be transmitted by fiber optic bundles, Prysner discloses a viewgraph projector that generates an optical image from a transparency slide and communicates the optical image via a multifiber coherent optical cable to a remote projection lens, which projects the optical image onto a screen. The viewgraph projector disclosed in Prysner therefore is in accordance with the traditional understanding in the art, communicating the optical image over a fiber bundle with a plurality of filaments. Similarly, the fiber optic intubating scope described in U.S. Pat. No. 5,363,838, issued to George, demonstrates the use of fiber optic bundles to illuminate a patient's internal structures and to communicate images of those internal structures to an optical camera. The optical camera disclosed in George is disposed in a proximal end of a semi-malleable tube and, like the illumination source, requires power. The fiber optic bundles extend the length of the semi-malleable tube, and, when a distal end of the semi-malleable tube is a patient's throat, the fiber optic bundles provide illumination for the optical camera and allow the optical camera to see the internal structures within the patient. Like the viewgraph projector in Prysner, the fiber optic intubating scope disclosed in George transmits images over a fiber optic cable comprising a fiber bundle with a plurality of filaments and follows the traditional understanding in the art.

Further, a recent article, entitled "Fiberoptic Tutorial," by Lee, describes the use of fiber bundles in fiber optic cables to transmit optical images. According to the Lee article, it is impossible for a single filament of a fiber optic cable to transmit an entire image. Stating that an individual filament can transmit only a spot with a certain color and intensity, the Lee article maintains, in accordance with the traditional understanding in the art, that a large number of individual filaments are required to transmit an image over a fiber optic cable. Further, as previously discussed, the Lee article requires that the individual filaments in the fiber bundle be aligned and fused together such that the individual filaments are ordered in exactly the same way at both ends of the fiber optic cable for the image to be created.

In view of the foregoing, it is believed that a need exists for a system for transmitting images that overcomes the aforementioned obstacles, limitations, and deficiencies of currently available imaging systems.

SUMMARY OF THE INVENTION

The present invention is directed toward a system for transmitting entire still and/or moving images via a single filament in a fiber optic cable. Through the use of the present invention, a camera produces an image, which is miniaturized and communicated in its entirety through a filament in a fiber optic cable to a display system. Upon receiving the image as miniaturized, the display system deminiaturizes and visibly presents the image substantially in real-time, and, being substantially continuously updated by the camera, the image can be presented as a moving image. The present invention therefore provides the advantages of visibly presenting real-time still and/or moving images of near and/or remote objects without requiring the use of either external power or fiber optic cables having a bundle of filaments.

A system of transmitting images in accordance with the present invention comprises a fiber optic cable, a camera, and a display system. The fiber optic cable has a filament for transmitting optical signals. Coupled with a proximal end region of the fiber optic cable, the camera comprises a lens system for receiving light signals from one or more still and/or moving objects. The lens system of the camera is optically coupled with, and in optical communication with, the filament of the fiber optic cable and is adapted to produce a substantially-reduced image of the objects preferably via an inverted microscope objective. Being focused on an initial image of the objects that is generated by the lens system, the inverted microscope objective is capable of intensifying and/or miniaturizing the initial image, thereby producing the substantially-reduced image. The substantially-reduced image, being substantially miniaturized, has a size that is substantially between one-thousandth and one-millionth of a size of the initial image.

The display system is coupled with a distal end region of the fiber optic cable and includes a lens system. The lens system of the display system is optically coupled with, and in optical communication with, the lens system of the camera via the filament of the fiber optic cable. Upon receiving the substantially-reduced image, the lens system of the display system is adapted to deminiaturize (or magnify) the substantially-reduced image, thereby producing a visibly-presentable image. The lens system of the display system preferably includes a microscope objective with a deminiaturization (or magnification) index that is substantially equal to an inverse or reciprocal of a miniaturization index of the inverted microscope objective. Using the substantially-reduced image as a object, the microscope objective is capable of generating a restored image with a size that is substantially between one thousand and one million times the size of the substantially-reduced image. Stated somewhat differently, the size of the restored image preferably is substantially equal to the size of the initial image produced by the lens system of the camera. The lens system of the display system is adapted to receive the restored image and, using the restored image as an object, is capable of generating and visibly presenting the visibly-presentable image.

In operation, a lens system of a camera is directed substantially toward one or more still and/or moving objects to be visibly presented. The objects reflect and/or otherwise emit light signals, some of which are directed substantially toward, and are received by, the lens system. The lens system of the camera generates an initial image of the objects and communicates the initial image to an inverted microscope objective. Being focused on the initial image, the inverted microscope objective intensifies the initial image, generating a substantially-reduced image of the objects. The substantially-reduced image is communicated in its entirety and in real-time from the lens system of the camera to a lens system of a display system via a filament of a fiber optic cable. A microscope objective included with the lens system of the display system receives and deminiaturizes the substantially-reduced image, producing a restored image of the substantially-reduced image. Being focused on the restored image, the lens system of the display system generates and visibly presents a visibly-presentable image of the objects.

It will be appreciated that a system for transmitting images in accordance with the present invention provides the capability of visibly presenting images of near and/or remote objects substantially in real-time. Also, since the lens system of the camera is capable of substantially continuously generating and intensifying images that can be substantially continuously transmitted to the display system via the fiber optic cable, the lens system of the display system is adapted to substantially continuously deminiaturize and visibly present the images. The image of the objects therefore is continuously updated and therefore can be visibly presented as a moving image. The system of the present invention provides the further advantage of communicating entire images through a single filament of a fiber optic cable without reducing image quality, thereby avoiding the need for and/or increased expense associated with fiber optic cables with a multitude of filaments. Since each filament in a fiber optic cable can be adapted to communicate entire images, the fiber optic cable can experience a substantial increase in its overall data transfer rate. Lastly, it will be appreciated that the system of the present invention provides the still further advantage of capturing and visibly presenting images without the need for a power source.

DETAILED DESCRIPTION OF THE PREFERRED EMBODIMENTS

Figure 1:
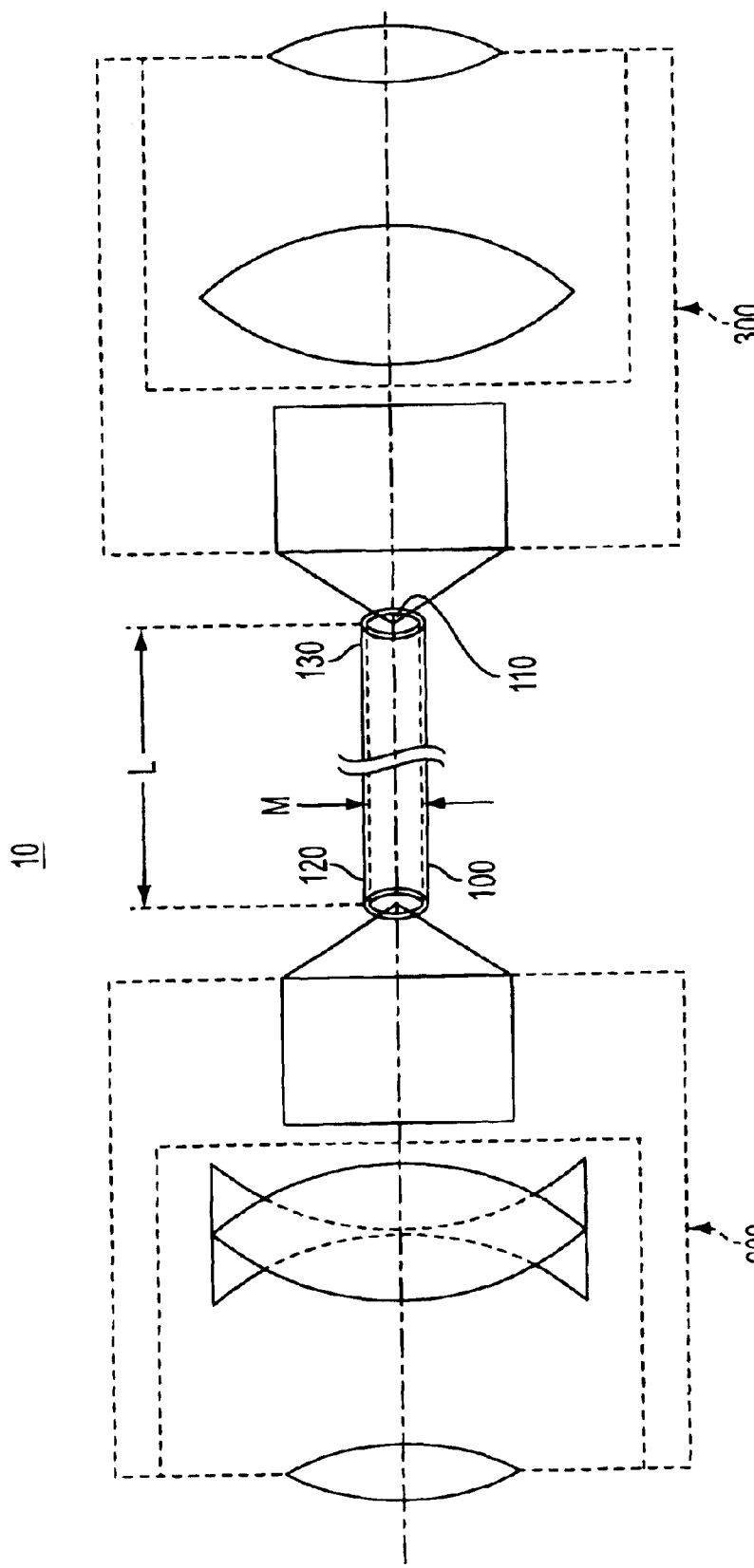
FIG. 1 is an illustration of one preferred embodiment of a system for transmitting images in accordance with the present invention.

Since the resolution of images communicated by fiber optic cable is restricted by the limited number of filaments that can be bundled into a fiber optic cable under present manufacturing techniques, a system that transmits entire images over a single-filament within a fiber optic cable can prove much more desirable and provide a basis for a wide range of image transmission applications, such as video applications. This result can be achieved, according to one embodiment of the present invention, by employing a system 10 for transmitting images as shown in FIG. 1. The system 10 includes a fiber optic cable 100, a camera 200, and a display system 300.

The fiber optic cable 100 can comprise any type of fiber optic cable that is well-known in the art. Although the system 10 can be adapted to incorporate any type of communication system and/or cable, such as copper cable, through the use of one or more transceivers, the fiber optic cable 100 is preferred because fiber optics have many advantages over copper cable. For example, relative to copper cable, fiber optics operate at higher speeds, have a wider bandwidth, can span longer distances without needing to be refreshed, have greater resistance to electromagnetic noise, and cost much less to maintain. The fiber optic cable 100 has a filament 110 for transmitting optical signals 20 (shown in FIG. 2) and proximal and distal opposite end regions 120, 130. Although this embodiment of the present invention discloses the use of the fiber optic cable 100 with the filament 110, the fiber optic cable 100 can include a plurality of filaments. Any additional filaments may be unused and/or employed to transmit other optical signals, such as transmitting (e.g. redundant) images from the camera 200 to a plurality of display systems 300. Further, as discussed in greater detail below, a system 1000 for transmitting images (shown in FIG. 7) can comprise a plurality of cameras 1200 and/or a plurality of display systems 1300, which are optically coupled and in optical communication via a fiber optic cable 1100 with a plurality of filaments 1110.

To facilitate substantially simultaneous communication of a plurality of modes and/or rays of light through the filament 110, the fiber optic cable 100 preferably is of a "multimode" type. In such a "multimode" type of fiber optic cable 100, the filament 110 has a core diameter M that is larger than a core diameter in a "single mode" type of fiber optic cable to avoid excess heat being dissipated inside the filament 110 when the optical signals 20 have certain qualities such as high energy and/or high density. The "multimode" type of fiber optic cable 100 preferably has a fiber size of 200/250, where the first number represents the core diameter M in microns and the second number represents a diameter in microns of a clad 115 (shown in FIG. 2) around the core. However, it will be appreciated that the filament 110 of the fiber optic cable 100 can comprise any commercially-available fiber size, such as 62.5/125, 50/125, 100/140, or 110/125, for example, as heat dissipation becomes less of a consideration and/or by varying the chemistry of the material, such as plastic or glass, used to form the core.

The fiber optic cable 100 also has a length L. Although generally unnecessary for shorter length cables, the fiber optic cable 100 can include one or more optical repeaters (not shown) for receiving, amplifying, and re-transmitting the optical signals 20 (shown in FIG. 2). An optical repeater should be coupled with, and in optical communication with, the filament 110 when the length L of the fiber optic cable 100 exceeds between approximately three hundred and thirty thousand kilometers with additional optical repeaters being added, as necessary, for approximately each additional three hundred to thirty thousand kilometers of cable length. Those skilled in the art will appreciate that fewer optical repeaters can be used and/or a spacing between successive optical repeaters can be increased as the core diameter M of the filament 110 decreases and/or the light signals 30 (shown in FIG. 2) are more highly intensified. Stated somewhat differently, the length L of the fiber optic cable 100 can be increased substantially inversely proportionally with the core diameter M of the filament 110 and/or substantially in proportion with the intensification of the light signals 30. If one or more optical repeaters are to be included with the system 10, the fiber optic cable 100 preferably is divided into a plurality of cable segments (not shown). Each of the plurality of cable segments has a preselected length; the preselected length of each cable segment can be any length up to between approximately three hundred and thirty thousand kilometers. One of the optical repeaters is disposed substantially between, and substantially in axial alignment with, adjacent cable segments to permit the filaments 110 of the adjacent cable segments to be optically coupled and in optical communication. Since one aspect of the present invention is that the system 10 for transmitting images can operate without an internal and/or external power source, the optical repeaters preferably are not powered; however, any type of optical repeater, including powered optical repeaters, may be used with the present invention.

Figure 2:
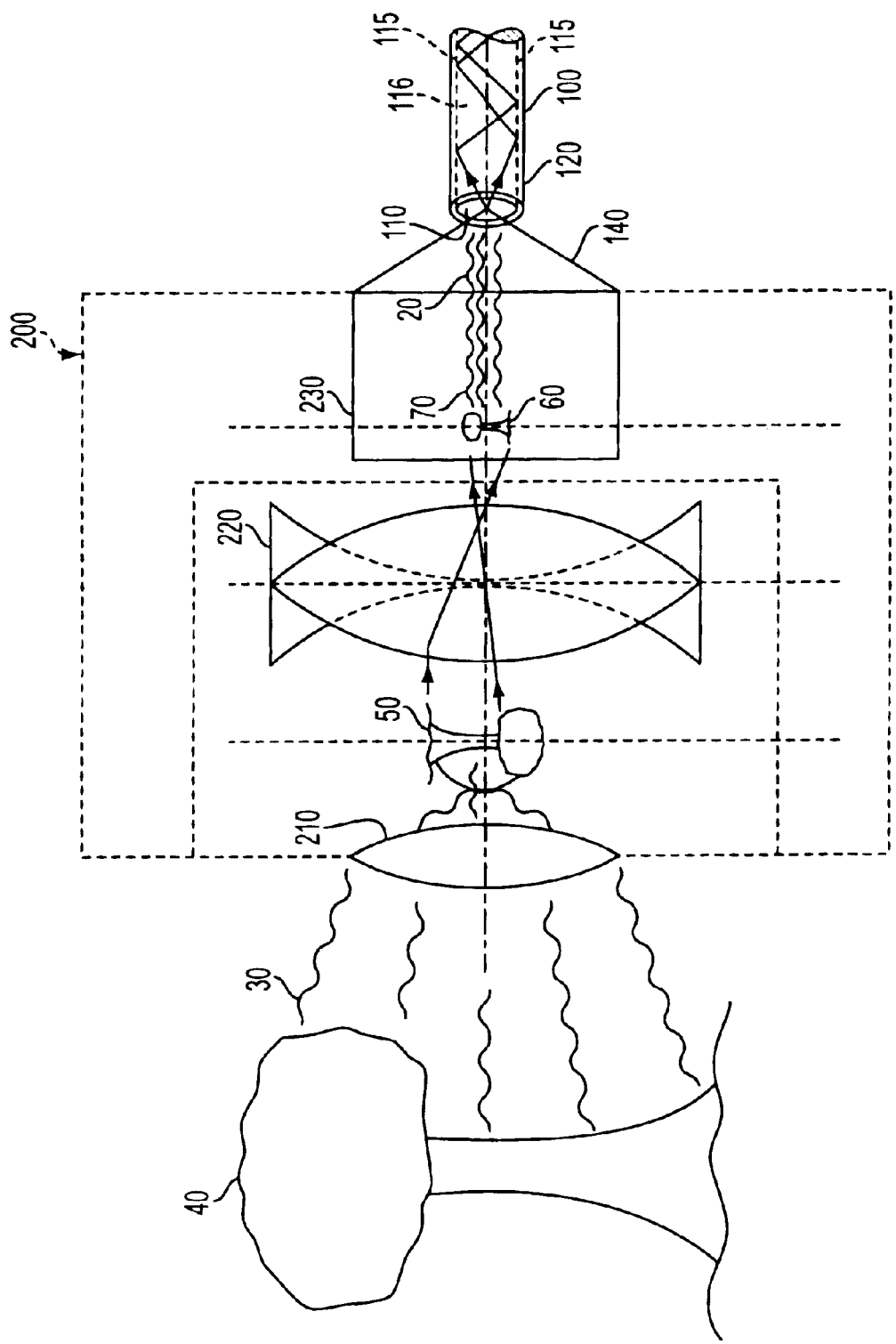
FIG. 2 is a detailed view of a camera of FIG. 1.

FIG. 2 provides an illustration of the camera 200 in accordance with the first embodiment of the present invention. The camera 200 includes a lens system 210. The camera 200 can be any type of camera, such as a still and/or video camera for capturing images on film and/or a digital medium. Since the lens system 210 preferably comprises an optical portion of a camera, however, it will be appreciated that none of the other capabilities and/or mechanisms of such a camera, such as a shutter or a film plate, are required for the present invention. As shown in FIG. 2, the camera 200 is directly and/or indirectly coupled with the proximal end region 120 of the fiber optic cable 100, and the lens system 210 is adapted for receiving light signals 30 from one or more objects 40, which may include still objects and/or moving objects. The light signals 30 can comprise natural and/or artificial light that is reflected from the objects 40 and/or, if one or more of the objects 40 is backlit and/or substantially translucent, natural and/or artificial light that passes through and/or around the objects 40. The camera 200, if desirable, can include a source of illumination (not shown) for momentarily or continuously illuminating and/or backlighting one or more of the objects 40. Like the system 10, the source of illumination also can be adapted to operate without a power source. For example, such an unpowered source of illumination can comprise a system, such as a mirror, for redirecting light from another natural and/or artificial source, external to the system 10, and substantially toward one or more of the objects 40. Alternatively, or in conjunction with the unpowered source of illumination, the source of illumination can comprise a powered source of illumination such as a flashbulb, a built-in repeat use flash system, a repeat use flash attachment, a floodlight, and/or any other type of illumination or lighting source. To facilitate the illumination of the objects 40, the source of illumination can be integral to, and/or separate or separable from, the camera 200 and/or the system 10.

Preferably comprising an optical portion of a standard 35 mm still camera, the lens system 210 can be any type of lens system, such as a wide-angle lens, a "normal" (or medium) lens, a telephoto lens, and/or any other type of lens system. For purposes of illustration, the lens system 210 has been depicted as a single element positive lens; however, it should be understood that a multiple element lens system can be used. Upon receiving the light signals 30 from one or more of the objects 40, the lens system 210 is adapted to produce a substantially-reduced image 60 of the objects 40 and is adjustable to, for example, focus and/or zoom in (or out) on one or more of the objects 40. The lens system 210 is optically coupled with, and in optical communication with, the filament 110. To facilitate optical coupling, the lens system 210 and the filament 110 preferably are substantially in axial alignment to provide a substantially direct optical path for the light signals 30 to travel from the lens system 210 to the filament 110. Although each element in this embodiment of the present invention is described as being substantially axially aligned, the elements preferably are precisely in axial alignment.

The lens system 210 preferably further includes an inverted microscope objective 220. The inverted microscope objective 220 can be physically separate from the lens system 210, as shown in FIG. 2, and/or can be substantially incorporated into the lens system 210. For purposes of illustration, the inverted microscope objective 220 has been depicted as a single element lens; however, it should be understood that a multiple element lens system can be used. The inverted microscope objective 220 is disposed substantially between, and substantially in axial alignment with, the lens system 210 and the filament 110 substantially adjacent to the proximal end region 120 of the fiber optic cable 100.

The lens system 210 is optically coupled with, and in optical communication with, the filament 110 via the inverted microscope objective 220. Upon receiving the light signals 30 from one or more of the objects 40, the lens system 210 is adapted to produce an initial image 50 of the objects 40 in a manner that is well-known in the art. The initial image 50 has a size (not shown). For example, when the lens system 210 comprises a lens system of a standard 35 mm still camera, the initial image 50 has a size with a maximum height of substantially thirty-six millimeters and a maximum width of substantially twenty-four millimeters (36 mm×24 mm), such that the initial image 50 is adapted to fill substantially an entire area allocated for images on 35 mm film.

The lens system 210 is further capable of optically communicating the initial image 50 to the inverted microscope objective 220. The initial image 50 generated by the lens system 210 serves as an object for the inverted microscope objective 220. The inverted microscope objective 220 preferably is focused on the initial image 50 and is separated from the initial image 50 by a distance, which preferably is substantially equal to fifty millimeters. To further ensure image quality, the inverted microscope objective 220 preferably is positioned to be flooded with the initial image 50. The inverted microscope objective 220 generally is flooded when the initial image 50 is sized, for example by being magnified or reduced, such that the initial image 50 spans substantially an entire usable area of the inverted microscope objective 220. The inverted microscope objective 220 can be adjustably positioned within the camera 200 such that a distance between the inverted microscope objective 220 and the lens system 210 and/or the filament 110 substantially adjacent to the proximal end region 120 can be modified during, for example, assembly and/or use.

Upon receipt of the initial image 50, the inverted microscope objective 220 is adapted to further intensify the initial image 50, producing the substantially-reduced image 60. The substantially-reduced image 60 has a size that is substantially between one-thousandth and one-millionth of a size of the initial image 50 and is capable of being transmitted over much longer distances than is the less intensified initial image 50. To help ensure image quality for objects 40 of various sizes and/or at various distances from the camera 200, the inverted microscope objective 220 can be adjustable, providing a plurality of miniaturization indexes. The plurality of miniaturization indexes may be adjustable over a continuous range and/or in a plurality of discrete steps, and can prove advantageous when one or more of the objects 40 is in motion and/or when it is desirable to focus on and/or zoom in (or out) on one or more of the objects 40. The inverted microscope objective 220 further is capable of communicating optical signals 70 that comprise the substantially-reduced image 60 to the filament 110 substantially adjacent to the proximal end region 120 of the fiber optic cable 100.

Figure 3A:
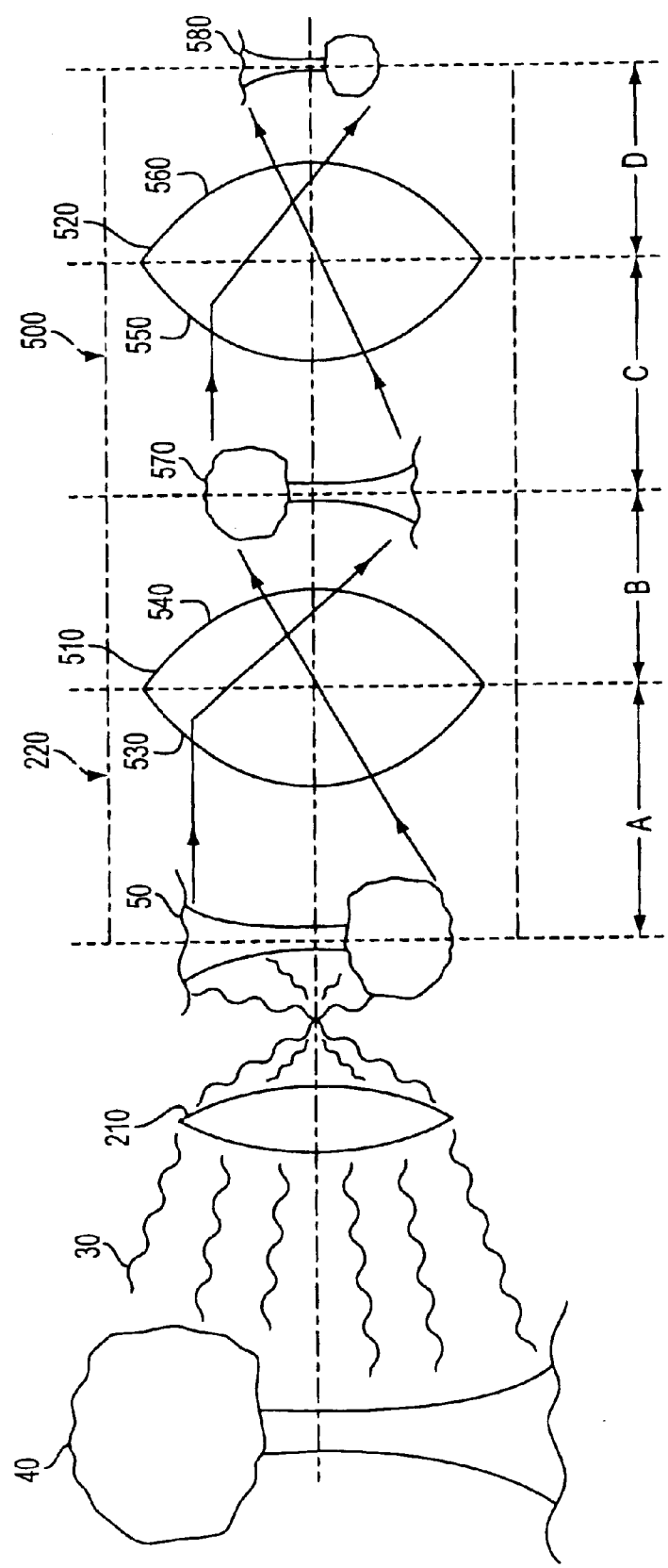
FIGS. 3A–B are a detailed illustration of an inverted microscope objective of the camera of FIG. 2.
Figure 3B:
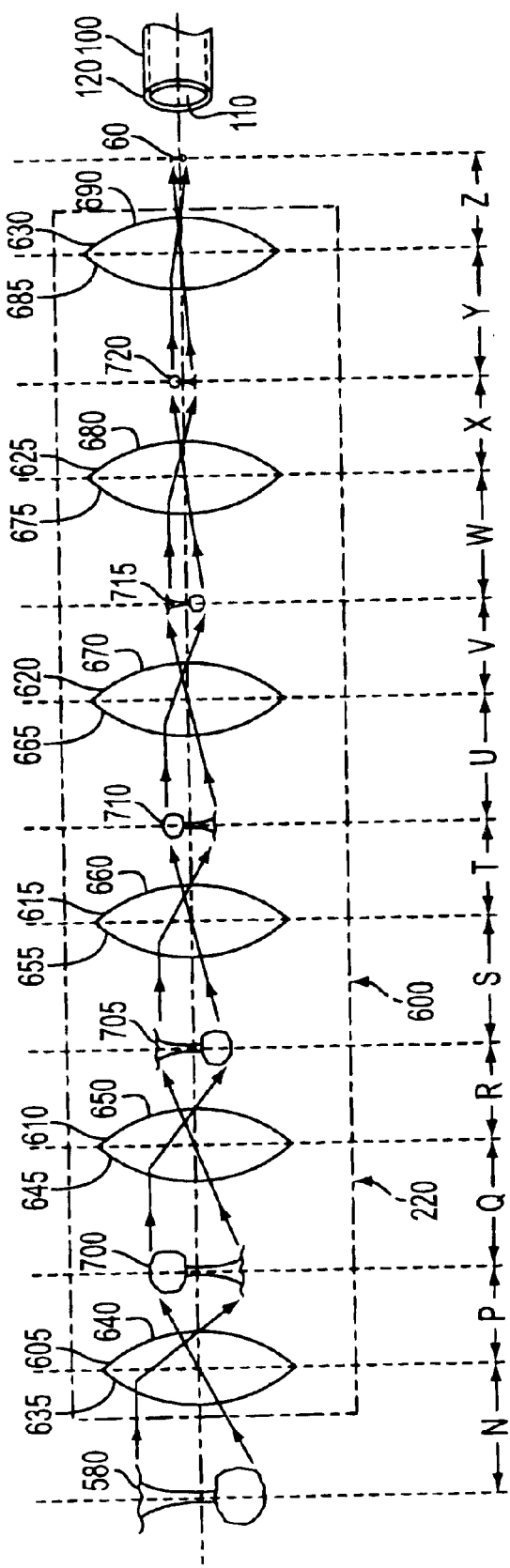

While the inverted microscope objective 220 can be constructed in any of many different forms, FIGS. 3A and 3B provide one detailed illustration of the inverted microscope objective 220 when the lens system 210 comprises a lens system of a standard 35 mm still camera. The inverted microscope objective 220 is disposed substantially between the lens system 210 of the camera 200 and the proximal end region 120 of the fiber optic cable 100 and is substantially in axial alignment with, and optically coupled with, the lens system 210 and the filament 110 substantially adjacent to the proximal end region 120. The inverted microscope objective 220 preferably includes eight lenses arranged in two stages.

As shown in FIG. 3A, the first stage 500 of the inverted microscope objective 220 preferably comprises two double convex converging lenses 510, 520, each of which is substantially in axial alignment with, and in optical communication with, the lens system 210 of the camera 200.

The first double convex converging lens 510 is disposed substantially between the lens system 210 and the second double convex converging lens 520. The first double convex converging lens 510 has a focal length (not shown) of substantially twenty millimeters and includes an object lens surface 530 and an image lens surface 540, each of which preferably has a radius of curvature of substantially twenty millimeters. Similarly to each lens comprising the inverted microscope objective 220, the object lens surface 530 of the first double convex converging lens 510 is directed substantially toward the objects 40; whereas, the image lens surface 540 is substantially adjacent to a reduced image 570 generated by the first double convex converging lens 510. The second double convex converging lens 520 has a focal length (not shown) of substantially twenty millimeters and includes an object lens surface 550 and an image lens surface 560. The object lens surface 550 and the image lens surface 560 each preferably have a radius of curvature of substantially twenty millimeters, and the second double convex converging lens 520 is disposed substantially between the first double convex converging lens 510 and a first double convex converging lens 605 (shown in FIG. 3B) of the second stage 600.

As was previously discussed in more detail above, the lens system 210 of the camera 200 is capable of receiving the light signals 30 from the one or more objects 40 and is adapted to produce the initial image 50. When the lens system 210 comprises a lens system of a standard 35 mm still camera, the initial image 50 has a size with a maximum height of substantially thirty-six millimeters and a maximum width of substantially twenty-four millimeters (36 mm×24 mm). The initial image 50 serves as an object for the first double convex converging lens 510, from which the reduced image 570 will be generated. The first double convex converging lens 510 preferably is focused on the initial image 50 and is separated from the initial image 50 by a distance A of substantially fifty millimeters. A distance B between the first double convex converging lens 510 and the reduced image 570 produced by the first double convex converging lens 510 is determined in accordance with the well-known lens equation for lenses in general, which is based upon the law of refraction geometrically constructed by W. Snell in 1621:

$$\frac{1}{f} = \frac{1}{d_o} + \frac{1}{d_i} \qquad \text{Equation 1}$$

where f is the focal length of a lens, $d_o$ is the distance between the center of the lens and an object, and $d_i$ is the distance between the center of the lens and an image of the object. Applying the general lens equation of Equation 1 to the first double convex converging lens 510, the distance B is calculated to be substantially equal to thirty-three and one-third millimeters. Further, the reduced image 570 has a size that is substantially equal to a product of the size of the initial image 50 and a miniaturization index (not shown) for the first double convex converging lens 510. The miniaturization index for the first double convex converging lens 510 is determined from the well-known magnification (or miniaturization) equation:

$$m = \frac{d_i}{d_o} \quad \text{Equation 2}$$

where the distances $d_i$ and $d_o$ each retain their definitions from the general lens equation of Equation 1 and m comprises a miniaturization index when a ratio of the distance, $d_i$, to the distance, $d_o$ is less than one and a deminiaturization (or magnification) index when the ratio exceeds one. For the first double convex converging lens 510, the miniaturization index is calculated to be substantially equal to two-thirds (⅔). Thus, the reduced image 570 generated by the first double convex converging lens 510 has a maximum height of substantially twenty-four millimeters and a maximum width of substantially sixteen millimeters (24 mm×16 mm).

Similarly, the reduced image 570, in turn, serves as an object for the second double convex converging lens 520, which generates a further-reduced image 580. The second double convex converging lens 520 preferably is focused on the reduced image 570 and is separated from the reduced image 570 by a distance C, which preferably is substantially equal to fifty millimeters. Stated somewhat differently, the second double convex converging lens 520 is displaced from the first double convex converging lens 510 by a total distance substantially equal to eighty-three and one-third millimeters. As with the first double convex converging lens 510, a distance D between the second double convex converging lens 520 and the further-reduced image 580 is calculated via the general lens equation of Equation 1 and is substantially equal to thirty-three and one-third millimeters. The further-reduced image 580 also has a size that is substantially equal to a product of the size of the reduced image 570 and a miniaturization index (not shown) for the second double convex converging lens 520. In accordance with the magnification (or miniaturization) equation of Equation 2, the miniaturization index for the second double convex converging lens 520 is calculated to be substantially equal to two-thirds (⅔). As a result, the further-reduced image 580 generated by the second double convex converging lens 520 has a maximum height substantially equal to sixteen millimeters and a maximum width substantially equal to ten and two-third millimeters. Thus, the first stage 500 of the inverted microscope objective 220 has a total miniaturization index substantially equal to a product of the miniaturization indexes for the first double convex converging lens 510 and the second double convex converging lens 520, or substantially four-ninths (⅔) and a total length, as measured from the initial image 50 to the further-reduced image 580, of approximately one hundred, sixty-six and two-third millimeters (166⅔ mm).

A second stage 600 of the inverted microscope objective 220 is shown in FIG. 3B. The second stage 600 preferably comprises six double convex converging lenses 605, 610, 615, 620, 625, and 630 each of which is, like the second stage 600, substantially axially aligned with and in optical communication with the first double convex converging lens 510 and the second double convex converging lens 520 of the first stage 500. The first double convex converging lens 605 has a focal length (not shown) of substantially ten millimeters and includes an object lens surface 635 and an image lens surface 640, each of which preferably has a radius of curvature of substantially ten millimeters. The first double convex converging lens 605 is disposed substantially between the second double convex converging lens 520 (shown in FIG. 3A) of the first stage 500 and the second double convex converging lens 610 of the second stage 600. The second double convex converging lens 610 of the second stage 600 includes an object lens surface 645 and an image lens surface 650, each of which preferably has a radius of curvature of substantially ten millimeters. The second double convex converging lens 610 has a focal length (not shown) of substantially ten millimeters and is disposed substantially between the first double convex converging lens 605 and the third double convex converging lens 615. Being disposed substantially between the second double convex converging lens 610 and the fourth double convex converging lens 620, the third double convex converging lens 615 has a focal length (not shown) of substantially ten millimeters and includes an object lens surface 655 and an image lens surface 660, each of which preferably has a radius of curvature of substantially ten millimeters.

The fourth double convex converging lens 620 includes an object lens surface 665 and an image lens surface 670, each of which preferably has a radius of curvature of substantially ten millimeters. The fourth double convex converging lens 620 has a focal length (not shown) of substantially ten millimeters and is disposed substantially between the third double convex converging lens 615 and the fifth double convex converging lens 625. Being disposed substantially between the fourth double convex converging lens 620 and the sixth double convex converging lens 630, the fifth double convex converging lens 625 has a focal length (not shown) of substantially ten millimeters and includes an object lens surface 675 and an image lens surface 680, each of which preferably has a radius of curvature of substantially ten millimeters. Lastly, the sixth double convex converging lens 630 has a focal length (not shown) of substantially ten millimeters and includes an object lens surface 685 and an image lens surface 690. The object lens surface 685 and the image lens surface 690 each preferably have a radius of curvature of substantially ten millimeters, and the sixth double convex converging lens 630 is disposed substantially between the fifth double convex converging lens 625 and the filament 110 substantially adjacent to the proximal end region 120 of the fiber optic cable 100.

Analogously to the second double convex converging lens 520 of the first stage 500, the further-reduced image 580 generated by the second double convex converging lens 520 (shown in FIG. 3A) of the first stage 500 serves as an object for the first double convex converging lens 605 of the second stage 600. The first double convex converging lens 605 preferably is focused on the further-reduced image 580 and generates a further-reduced image 700. The first double convex converging lens 605 is separated from the further-reduced image 580 by a distance N of substantially fifty millimeters. Stated somewhat differently, the first double convex converging lens 605 of the second stage 600 is displaced from the second double convex converging lens 520 of the first stage 500 by a total distance substantially equal to eighty-three and one-third millimeters. As with the double convex converging lenses 510, 520 of the first stage 500, a distance P between the first double convex converging lens 605 and the further-reduced image 700 is calculated via the general lens equation of Equation 1 and is substantially equal to twelve and one-half millimeters. The further-reduced image 700 also has a size that is substantially equal to a product of the size of the further-reduced image 580 and a miniaturization index (not shown) for the first double convex converging lens 605. In accordance with the magnification (or miniaturization) equation of Equation 2, the miniaturization index for the first double convex converging lens 605 is calculated to be substantially equal to one-fourth (¼). Thus, the further-reduced image 700 generated by the first double convex converging lens 605 has a maximum height substantially equal to four millimeters and a maximum width substantially equal to two and two-third millimeters (4 mm×2⅔ mm).

Similarly, the further-reduced image 700, in turn, serves as an object for the second double convex converging lens 610. The second double convex converging lens 610 preferably is focused on the further-reduced image 700 and generates a further-reduced image 705. The second double convex converging lens 610 is separated from the further-reduced image 700 by a distance Q, and the distance Q preferably is substantially equal to fifty millimeters. Stated somewhat differently, the second double convex converging lens 610 is displaced from the first double convex converging lens 605 by a total distance substantially equal to sixty-two and one-half millimeters. As with the first double convex converging lens 605, a distance R between the second double convex converging lens 610 and the further-reduced image 705 is calculated via the general lens equation of Equation 1 and is substantially equal to twelve and one-half millimeters. The further-reduced image 705 also has a size that is substantially equal to a product of the size of the further-reduced image 700 and a miniaturization index (not shown) for the second double convex converging lens 610. In accordance with the magnification (or miniaturization) equation of Equation 2, the miniaturization index for the second double convex converging lens 610 is calculated to be substantially equal to one-fourth (¼). Thus, the further-reduced image 705 generated by the second double convex converging lens 610 has a maximum height substantially equal to one millimeter and a maximum width substantially equal to two-thirds of a millimeter (1 mm×⅔ mm).

The further-reduced image 705 serves as an object for the third double convex converging lens 615, which generates a further-reduced image 710. The third double convex converging lens 615 preferably is focused on the further-reduced image 705 and is separated from the further-reduced image 705 by a distance S, which is substantially equal to fifty millimeters. Stated somewhat differently, the third double convex converging lens 615 is displaced from the second double convex converging lens 610 by a total distance substantially equal to sixty-two and one-half millimeters. As before, a distance T between the third double convex converging lens 615 and the further-reduced image 710 is calculated via the general lens equation of Equation 1 and is substantially equal to twelve and one-half millimeters. The further-reduced image 710 also has a size that is substantially equal to a product of the size of the further-reduced image 705 and a miniaturization index (not shown) for the third double convex converging lens 615. In accordance with the magnification (or miniaturization) equation of Equation 2, the miniaturization index for the third double convex converging lens 615 is calculated to be substantially equal to one-fourth (¼). Thus, the further-reduced image 710 generated by the third double convex converging lens 615 has a maximum height substantially equal to one-fourth of a millimeter and a maximum width substantially equal to one-sixth of a millimeter (¼ mm×⅙ mm).

In turn, the further-reduced image 710 serves as an object for the fourth double convex converging lens 620. The fourth double convex converging lens 620 preferably is focused on the further-reduced image 710 and generates a further-reduced image 715. The fourth double convex converging lens 620 is separated from the further-reduced image 710 by a distance U that is substantially equal to fifty millimeters. Stated somewhat differently, the fourth double convex converging lens 620 is displaced from the third double convex converging lens 615 by a total distance substantially equal to sixty-two and one-half millimeters. A distance V between the fourth double convex converging lens 620 and the further-reduced image 715 is calculated via the general lens equation of Equation 1 and is substantially equal to twelve and one-half millimeters. The further-reduced image 715 also has a size that is substantially equal to a product of the size of the further-reduced image 710 and a miniaturization index (not shown) for the fourth double convex converging lens 620. In accordance with the magnification (or miniaturization) equation of Equation 2, the miniaturization index for the fourth double convex converging lens 620 is calculated to be substantially equal to one-fourth (¼). Thus, the further-reduced image 715 generated by the fourth double convex converging lens 620 has a maximum height substantially equal to one-sixteenth of a millimeter and a maximum width substantially equal to one twenty-fourth of a millimeter (1/16 mm×1/24 mm).

The further-reduced image 715 serves as an object for the fifth double convex converging lens 625, which generates a further-reduced image 720. The fifth double convex converging lens 625 preferably is focused on the further-reduced image 715 and is separated from the further-reduced image 715 by a distance W of substantially fifty millimeters. Stated somewhat differently, the fifth double convex converging lens 625 is displaced from the fourth double convex converging lens 620 by a total distance substantially equal to sixty-two and one-half millimeters. A distance X between the fifth double convex converging lens 625 and the further-reduced image 720 is calculated via the general lens equation of Equation 1 as previously discussed and is substantially equal to twelve and one-half millimeters. The further-reduced image 720 also has a size that is substantially equal to a product of the size of the further-reduced image 715 and a miniaturization index (not shown) for the fifth double convex converging lens 625. In accordance with the magnification (or miniaturization) equation of Equation 2, the miniaturization index for the fifth double convex converging lens 625 is calculated to be substantially equal to one-fourth (¼). Thus, the further-reduced image 720 generated by the fifth double convex converging lens 625 has a maximum height substantially equal to one sixty-fourth of a millimeter and a maximum width substantially equal to one ninety-sixth of a millimeter (1/64 mm×1/96 mm).

Lastly, the sixth double convex converging lens 630 generates the substantially-reduced image 60. The sixth double convex converging lens 630 preferably is focused on the further-reduced image 720, which serves as an object for the sixth double convex converging lens 630, and is separated from the further-reduced image 720 by a distance Y of substantially fifty millimeters. Stated somewhat differently, the sixth double convex converging lens 630 is displaced from the fifth double convex converging lens 625 by a total distance substantially equal to sixty-two and one-half millimeters. As before, a distance Z between the sixth double convex converging lens 630 and the substantially-reduced image 60 is calculated via the general lens equation of Equation 1 and is substantially equal to twelve and one-half millimeters. The size of the substantially-reduced image 60 is substantially equal to a product of the size of the further-reduced image 720 and a miniaturization index (not shown) for the sixth double convex converging lens 630. In accordance with the magnification (or miniaturization) equation of Equation 2, the miniaturization index for the sixth double convex converging lens 630 is calculated to be substantially equal to one-fourth (¼). Thus, the substantially-reduced image 60 generated by the sixth double convex converging lens 630 has a maximum height substantially equal to one two hundred and fifty-sixth of a millimeter and a maximum width substantially equal to one three hundred and eighty-fourth of a millimeter ($1/256$ mm×$1/384$ mm). Once generated, the substantially-reduced image 60 is communicated to the filament 110 substantially adjacent to the proximal end region 120 of the fiber optic cable 100. The second stage 600 of the inverted microscope objective 220 therefore has a miniaturization index substantially equal to a product of the miniaturization indexes for the six double convex converging lenses 605, 610, 615, 620, 625, and 630, or substantially one four thousand and ninety-sixth ($1/4096$), and a total length, as measured from the further-reduced image 580 to the substantially-reduced image 60, of approximately three hundred, seventy-five millimeters (375 mm).

The inverted microscope objective 220 therefore has a total length, as measured from the initial image 50 to the substantially-reduced image 60, of approximately five hundred, forty-one and two-third millimeters ($541\ 2/3$ mm) and a total miniaturization index substantially equal to a product of the miniaturization indexes for the first stage 500 and the second stage 600 or substantially one nine thousand, two hundred, and sixteenth ($1/9216$). As will be appreciated by those skilled in the art, any aberration present on a given lens in the inverted microscope objective 220 can be cancelled out, in whole or in part, by any aberration on a next lens following the given lens. Such an aberration also can be remedied by the use of a divergence lens (not shown). Such a divergence lens preferably has a radius of curvature substantially equal to a radius of curvature of the given lens and is substantially axially aligned with the given lens. The divergence lens is disposed between the given lens and a lens adjacent to and preceding the given lens. Further, one or more of the lenses in the inverted microscope objective 220 can be adjustably mounted such that the distance between consecutive lenses can be increased and/or decreased, preferably by up to substantially twenty percent of the distance. For example, the adjustable mounting for each lens can comprise one or more individual adjustment screws associated with a gear-and-track system in a manner that is well-known in the art. Since FIGS. 3A and 3B provide only one illustrative example of the inverted microscope objective 220, it will likewise be recognized that the construction of the inverted microscope objective 220 can be altered, as desired, by modifying, for example, the quantity and/or characteristics of one or more of the individual lenses and/or the distance between two or more adjacent lenses. By using such an alternate construction, the overall characteristics of the inverted microscope objective 220, such as the total miniaturization index or the total length, also may be changed.

Returning to FIG. 2, the lens system 210 and/or the inverted microscope objective 220 is optically coupled with, and adapted for optical communication with, the filament 110 substantially adjacent to the proximal end region 120 of the fiber optic cable 100 via, for example, an optical coupler 140. The optical coupler 140 can comprise any type of optical coupler and is disposed substantially between, and substantially in axial alignment with, the lens system 210 and the filament 110 substantially adjacent to the proximal end region 120. To facilitate optical communication between the lens system 210 and/or the inverted microscope objective 220 and the filament 110 substantially adjacent to the proximal end region 120, the optical coupler 140 is adapted to provide the optical signals 70 that comprise the substantially-reduced image 60 with a preselected angle of incidence (not shown) upon entry into the filament 110. Preferably, the optical coupler 140 is adjustable such that the preselected angle of incidence of the optical signals 70 can include any of a plurality of angles of incidence. The plurality of angles of incidence may be adjustable over a continuous range and/or in a plurality of discrete steps.

The camera 200 also can include a collimating and focusing system 230 to further facilitate optical communication with the filament 110. The collimating and focusing system 230 can comprise any type of collimating and focusing system and can be separate from, and/or substantially integrated with, the optical coupler 140. Generally comprising a system of prisms (not shown) for converting dispersive light signals into substantially aligned and substantially parallel light signals, such collimating and focusing systems 230, like the optical coupler 140, are well-known in the art. The collimating and focusing system 230 is disposed substantially between, and substantially in axial alignment with, the lens system 210 and/or the inverted microscope objective 220 and the optical coupler 140. The collimating and focusing system 230 has an input (not shown) for receiving the optical signals 70 comprising the substantially-reduced image 60 and an output (not shown) for producing and emitting optical signals 20 that are substantially collimated and focused. The input of the collimating and focusing system 230 is substantially directed toward and focused on the substantially-reduced image 60, and the output of the collimating and focusing system 230 is coupled with the optical coupler 140. The output of the collimating and focusing system 230 and/or the optical coupler 140 can be angularly adjustable such that the optical signals 20 are substantially aligned and substantially parallel, entering the filament 110 substantially adjacent to the proximal end region 120 substantially at a preselected angle of incidence (not shown). The preselected angle of incidence is selected such that the optical signals 20 enter the filament 110 at an angle of substantially forty-five degrees and are reflected internally within the filament 110.

By substantially conforming the optical signals 70, the collimating and focusing system 230 is capable of producing and emitting the optical signals 20, comprising the substantially-reduced image 60, that pass from the camera 200 to the filament 110 of the fiber optic cable 100 while avoiding any unpredictably and/or undesirable reflection and/or refraction during the change in media. Like the optical coupler 140, the collimating and focusing system 230 can be adjustable such that the preselected angle of incidence of the optical signals 20 can include any of a plurality of angles of incidence. The plurality of angles of incidence may be adjustable over a continuous range and/or in a plurality of discrete steps. The use of the collimating and focusing system 230 serves to further ensure image quality and enables the optical signals 20 to traverse longer fiber optic cables 100 without the need for an optical repeater.

Figure 4:
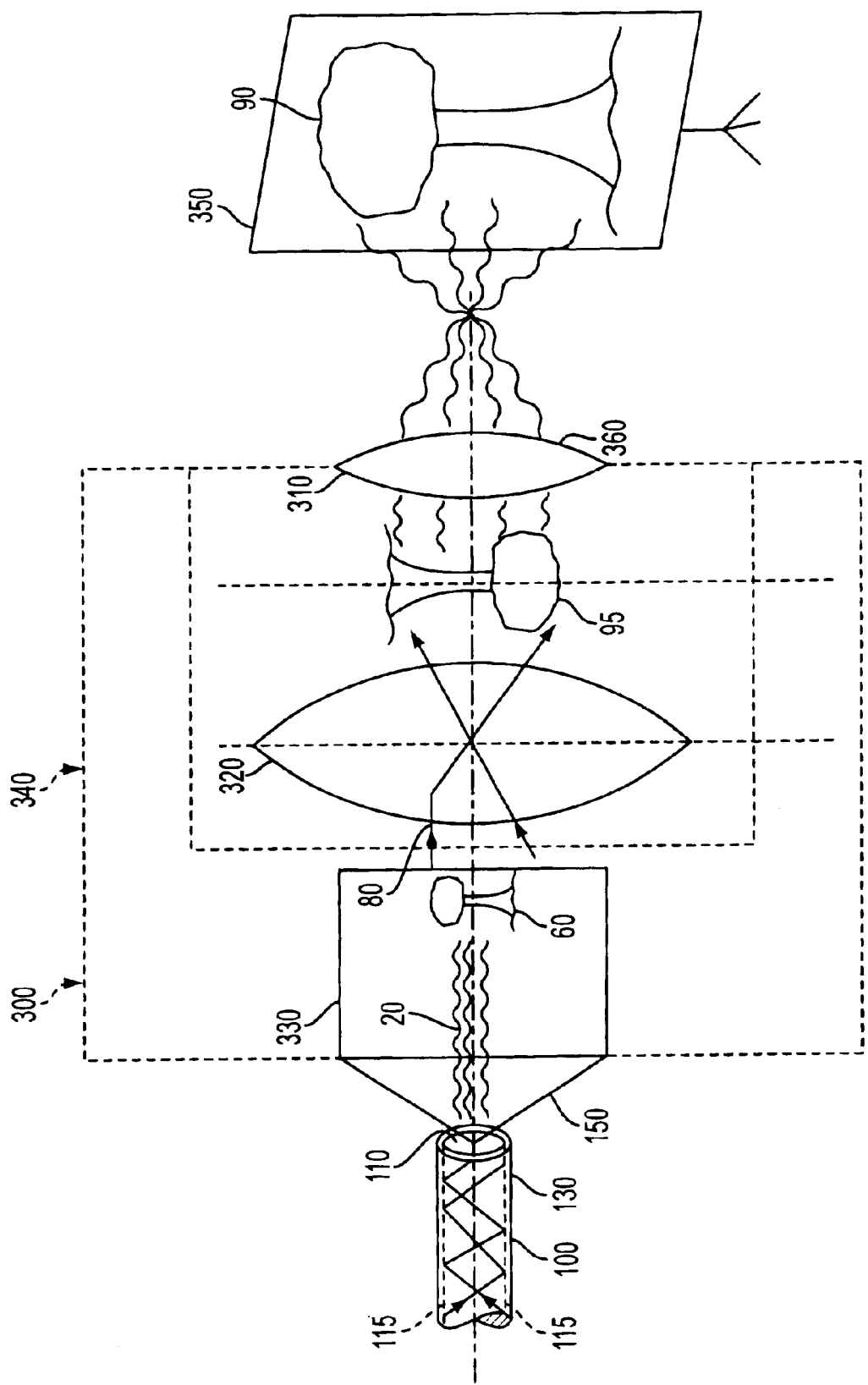
FIG. 4 is a detailed view of a first embodiment of a display system of FIG. 1.

The display system 300 as shown in FIG. 4 includes a lens system 310 and can comprise any type of display system, such as a projector for projecting images on a viewing screen. Although any type of display system can be used with the present invention, it will be appreciated that the present invention does not require any of the other capabilities and/or mechanisms of such display systems other than the lens system 310. The display system 300 is directly and/or indirectly coupled with the distal end region 130 of the fiber optic cable 100, and the lens system 310 is capable of receiving the optical signals 20 from the lens system 210 (shown in FIG. 2) of the camera 200 via the filament 110 of the fiber optic cable 100. Similarly to the lens system 230 of the camera 200, the lens system 310 of the display system 300 is optically coupled with, and adapted for optical communication with, the filament 110 substantially adjacent to the distal end region 130 of the fiber optic cable 100 via, for example, an optical coupler 150. Being well-known in the art, the optical coupler 150 can comprise any type of optical coupler. The optical coupler 150 is disposed substantially between, and substantially in axial alignment with, the lens system 310 and the filament 110 substantially adjacent to the distal end region 130.

To align optical communication between the lens system 310 and the filament 110, the display system 300 preferably includes a collimating and focusing system 330, which can be separate from, and/or substantially integrated with, the optical coupler 150. Like the collimating and focusing system 230 (shown in FIG. 2) of the camera 200, the collimating and focusing system 330 is well-known in the art and can comprise any type of collimating and focusing system. Used to further ensure image quality, the collimating and focusing system 330 is disposed substantially between the optical coupler 150 and the lens system 310 and is substantially axially aligned with the lens system 310. The collimating and focusing system 330 has an input (not shown) for receiving the optical signals 20 comprising the substantially-reduced image 60 from the filament 110 and an output (not shown) for producing and emitting optical signals 80 that are substantially collimated and focused. The input of the collimating and focusing system 330 is coupled with the optical coupler 150, and the output is adapted to optically communicate the optical signals 80 to the lens system 310. By substantially conforming the optical signals 20, the collimating and focusing system 330 produces and emits the optical signals 80 that pass from the filament 110 of the fiber optic cable 100 to the display system 300 while avoiding any unpredictably and/or undesirable reflection and/or refraction during the change in media. Since the optical signals 20 emitted from the filament 110 can exhibit non-linear behavior, the collimating and focusing system 330 preferably has more prismatic sophistication than the collimating and focusing system 230 of the camera 200 to substantially axially align the optical signals 80 with the lens system 310.

Although any type of lens system can be used, the lens system 310 preferably comprises an optical portion of a standard 35 mm still projector. For purposes of illustration, the lens system 310 has been depicted in FIG. 4 as a single element positive lens; however, it should be understood that a multiple element lens system can be used. Upon receiving the optical signals 80 that comprise the substantially-reduced image 60, the lens system 310 is adapted to produce a visibly-presentable image 90 from the substantially-reduced image 60. The lens system 310 further can be adjustable, providing a focusing capability and/or a plurality of deminiaturization (or magnification) indexes for visibly presenting the visibly-presentable image 90. The plurality of deminiaturization indexes may be adjustable over a continuous range and/or in a plurality of discrete steps. The plurality of deminiaturization indexes can prove advantageous when one or more of the objects 40 is in motion and/or when it is desirable to modify a size of the visibly-presentable image 90, such as by increasing (or decreasing) the visibly-presentable image 90 by zooming in (or out).

The visibly-presentable image 90 can comprise still images and/or moving images. As was previously discussed in more detail above, the lens system 210 (shown in FIG. 2) of the camera 200 is capable of substantially continuously receiving the light signals 30 from the one or more moving and/or still objects 40 and, as a result, is able to substantially continuously update the substantially-reduced image 60. Since the fiber optic cable 100 is adapted for continuously transmitting the optical signals 20 comprising the substantially-reduced image 60, the display system 300 is capable of substantially continuously receiving and deminiaturizing the substantially-reduced image 60 as updated. The visibly-presentable image 90 therefore also is continuously updated and can be visibly presented in motion. Stated somewhat differently, the visibly-presentable image 90 comprises a "real-time" image of the one or more objects 40 because the optical signals 20 are substantially continuously communicated from the camera 200 to the display system 300 substantially at the speed of light.

The lens system 310 preferably includes a microscope objective 320 for generating a restored image 95 from the optical signals 80 that comprise the substantially-reduced image 60. The microscope objective 320, which can comprise any type of optical microscope objective that is well-known in the art, can be physically separate from the lens system 310, as shown in FIG. 4, and/or can be substantially incorporated into the lens system 310. The microscope objective 320 is disposed substantially between, and substantially in axial alignment with, the filament 110 substantially adjacent to the distal end region 130 of the fiber optic cable 100 and the lens system 310. The filament 110 substantially adjacent to the distal end region 130 is optically coupled with, and in optical communication with, the lens system 310 via the microscope objective 320. Using the substantially-reduced image 60 emitted from the filament 110 as an object, the microscope objective 320 is adapted to produce the restored image 95 of the objects 40. The microscope objective 320 preferably is focused on the substantially-reduced image 60 and is separated from the substantially-reduced image 60 by a preselected distance, which preferably is substantially equal to twelve and one-half millimeters. To further ensure image quality, the microscope objective 320 preferably is positioned such that approximately an entire usable area of the microscope objective 320 is flooded with the substantially-reduced image 60. The microscope objective 320 can be adjustably positioned within the display system 300 such that a distance between the microscope objective 320 and the lens system 310 and/or the filament 110 substantially adjacent to the distal end region 130 can be modified during, for example, assembly and/or use.

Upon receiving the optical signals 80, the microscope objective 320 is capable of deminiaturizing (or magnifying) the optical signals 80 to produce the restored image 95 with a size. Although the microscope objective 320 can be provided with any deminiaturization (or magnification) index, the microscope objective 320 preferably has a deminiaturization index that is substantially between one thousand and one million. Thereby, the size of the restored image 95 can be substantially equal to the size of the initial image 50 that is produced by the lens system 210 of the camera 200. For example, when the lens system 210 (shown in FIG. 2) of the camera 200 comprises a lens system of a standard 35 mm still camera and the lens system 310 of the display system 300 comprises a lens system of a standard 35 mm still projector, the initial image 50 and the restored image 95 each preferably have a maximum height of substantially thirty-six millimeters and a maximum width of substantially twenty-four millimeters. The restored image 95 thereby is sized to flood the lens system 310 to optimize image quality. To help ensure that the lens system 310 is flooded for objects 40 of various sizes, the microscope objective 320 can be adjustable, providing a plurality of deminiaturization (or magnification) indexes. The plurality of deminiaturization indexes may be adjustable over a continuous range and/or in a plurality of discrete steps. The plurality of deminiaturization indexes can prove advantageous when one or more of the objects 40 is in motion and/or when it is desirable to modify a size of the visibly-presentable image 90, such as by increasing (or decreasing) the visibly-presentable image 90 by zooming in (or out).

Figure 5A:
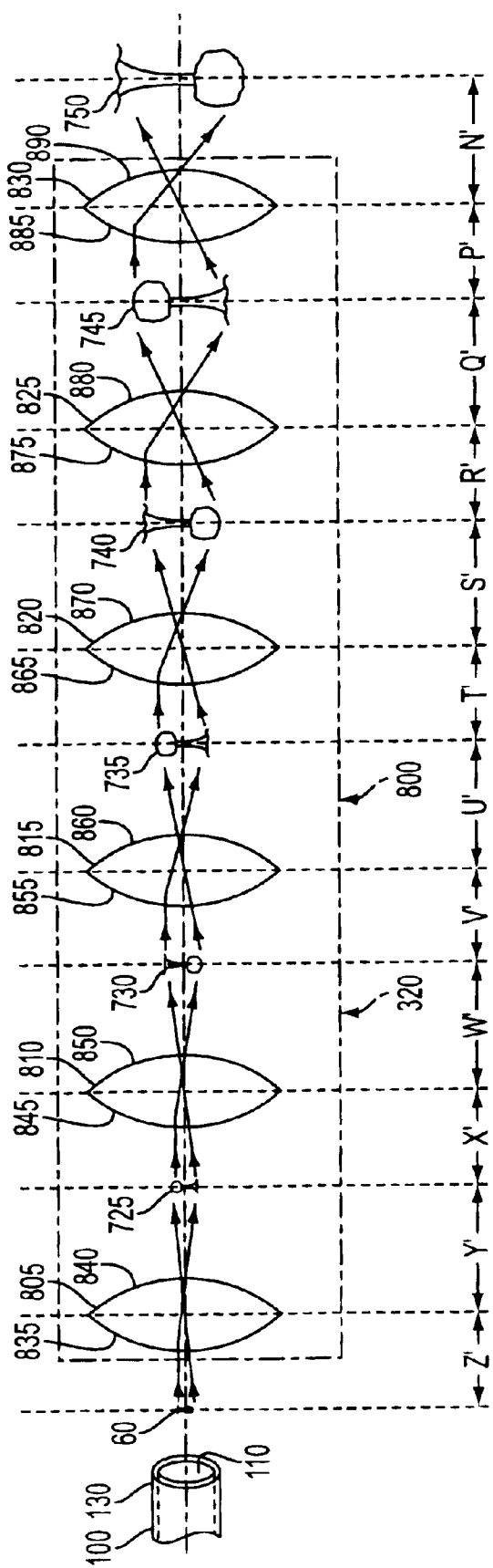
FIGS. 5A–B are a detailed illustration of a microscope objective of the display system of FIG. 4.
Figure 5B:
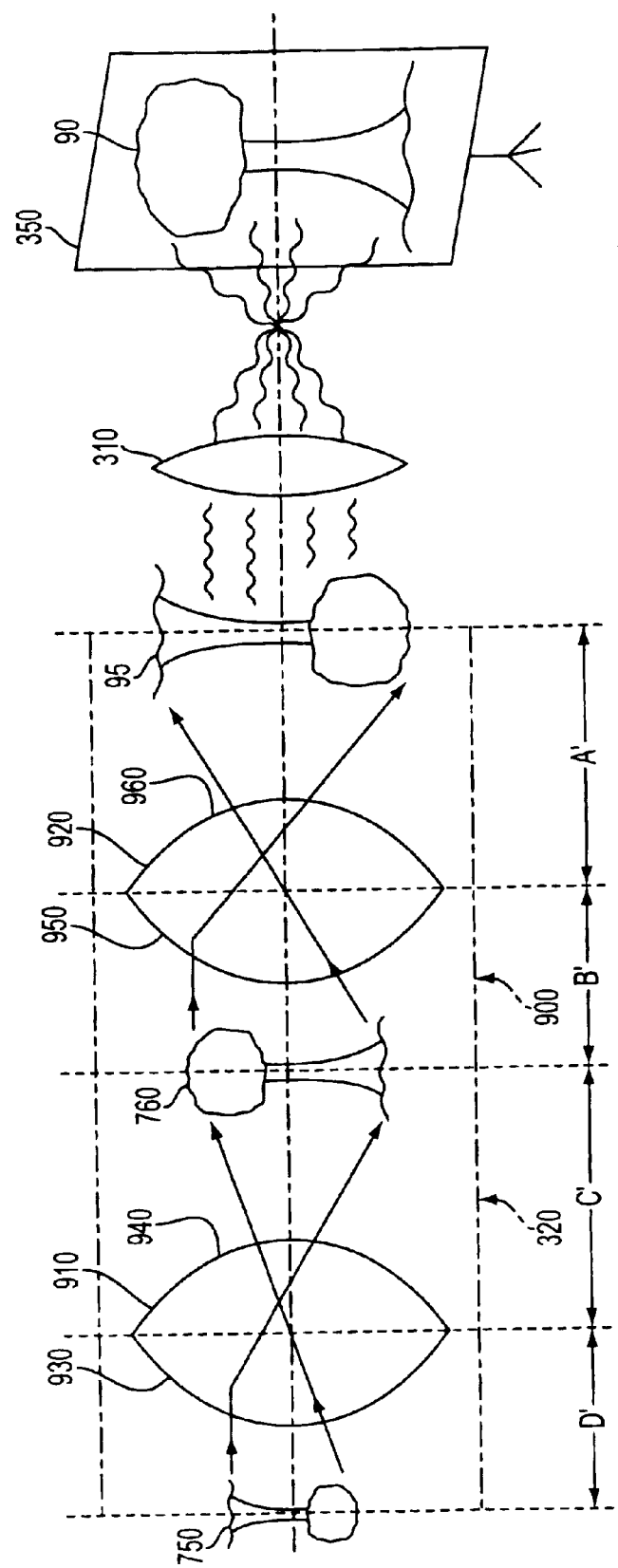

While the microscope objective 320 can be constructed in any of many different forms, FIGS. 5A and 5B provide one detailed illustration of the microscope objective 320 when the lens system 210 comprises a lens system of a standard 35 mm still camera and the lens system 310 comprises a lens system of a standard 35 mm still projector. The microscope objective 320 preferably has a total deminiaturization (or magnification) index (not shown) that is substantially equal to an inverse or reciprocal of the total miniaturization index of the inverted microscope objective 220 such that the size of the restored image 95 is substantially equal to the size of the initial image 50 produced by the lens system 210. In particular, when the lens system 210 (shown in FIG. 2) of the camera 200 comprises a lens system of a standard 35 mm still camera and the lens system 310 (shown in FIG. 4) of the display system 300 comprises a lens system of a standard 35 mm still projector, the initial image 50 and the restored image 95 each preferably have a maximum height of substantially thirty-six millimeters and a maximum width of substantially twenty-four millimeters (36 mm×24 mm).

The microscope objective 320 is disposed substantially between the lens system 310 of the display system 300 and the distal end region 130 of the fiber optic cable 100. The microscope objective 320 is substantially in axial alignment with, and optically coupled with, the lens system 310 and the filament 110 substantially substantially adjacent to the distal end region 130 of the fiber optic cable 100 and preferably includes eight lenses arranged in two stages. As shown in FIG. 5A, a first stage 800 of the microscope objective 320 preferably comprises six double convex converging lenses 805, 810, 815, 820, 825, and 830 each of which is, like the first stage 800, substantially axially aligned with, and in optical communication with, the filament 110 substantially adjacent to the distal end region 130. The first double convex converging lens 805 has a focal length (not shown) of substantially ten millimeters and includes an object lens surface 835 and an image lens surface 840, each of which preferably has a radius of curvature of substantially ten millimeters. Similarly to each lens comprising the microscope objective 320, the object lens surface 835 of the first double convex converging lens 805 is directed substantially toward the substantially-reduced image 60, which serves as an object for the microscope objective 320; whereas, the image lens surface 840 is substantially adjacent to an expanded image 725 generated by the first double convex converging lens 805. The first double convex converging lens 805 is disposed substantially between the filament 110 substantially adjacent to the distal end region 130 of the fiber optic cable 100 and the second double convex converging lens 810. The second double convex converging lens 810 includes an object lens surface 845 and an image lens surface 850. The object lens surface 845 and the image lens surface 850 each preferably have a radius of curvature of substantially ten millimeters. The second double convex converging lens 810 has a focal length (not shown) of substantially ten millimeters and is disposed substantially between the first double convex converging lens 805 and the third double convex converging lens 815.

Being disposed substantially between the second double convex converging lens 810 and the fourth double convex converging lens 820, the third double convex converging lens 815 has a focal length (not shown) of substantially ten millimeters. The third double convex converging lens 815 also includes an object lens surface 855 and an image lens surface 860, each of which preferably has a radius of curvature of substantially ten millimeters. The fourth double convex converging lens 820 includes an object lens surface 865 and an image lens surface 870, each of which preferably has a radius of curvature of substantially ten millimeters. The fourth double convex converging lens 820 has a focal length (not shown) of substantially ten millimeters and is disposed substantially between the third double convex converging lens 815 and the fifth double convex converging lens 825. Being disposed substantially between the fourth double convex converging lens 820 and the sixth double convex converging lens 830, the fifth double convex converging lens 825 has a focal length (not shown) of substantially ten millimeters. The fifth double convex converging lens 825 also includes an object lens surface 875 and an image lens surface 880, each of which preferably has a radius of curvature of substantially ten millimeters. Lastly, the sixth double convex converging lens 830 has a focal length (not shown) of substantially ten millimeters and includes an object lens surface 885 and an image lens surface 890. The object lens surface 885 and the image lens surface 890 each preferably have a radius of curvature of substantially ten millimeters, and the sixth double convex converging lens 830 is disposed substantially between the fifth double convex converging lens 825 and the first double convex converging lens 910 (shown in FIG. 5B) of a second stage 900 of the microscope objective 320.

As was previously discussed in more detail above, the substantially-reduced image 60 is communicated from the lens system 210 and/or the inverted microscope objective 220 of the camera 200 to the microscope objective 320 of the display system 300 via the filament 110 of the fiber optic cable 100. Upon receipt by the display system 300, the substantially-reduced image 60 serves as an object for the first double convex converging lens 805 of the first stage 800. The first double convex converging lens 805 preferably is focused on the substantially-reduced image 60 and generates the expanded image 725 from the substantially-reduced image 60. The first double convex converging lens 805 is adapted to project the expanded image 725 for a distance Y' substantially toward the second double convex converging lens 810. When the distance Y' is substantially equal to fifty millimeters, a distance Z' between the first double convex converging lens 805 and the substantially-reduced image 60 is calculated to be substantially equal to twelve and one-half millimeters via the general lens equation of Equation 1. The expanded image 725 also has a size that is substantially equal to a product of the size of the substantially-reduced image 60 and a deminiaturization (or magnification) index (not shown) for the first double convex converging lens 805. In accordance with the magnification (or miniaturization) equation of Equation 2, the deminiaturization index for the first double convex converging lens 805 is calculated to be substantially equal to four (4). Since the substantially-reduced image 60 has a maximum height that is substantially equal to one two hundred and fifty-sixth of a millimeter and a maximum width that is substantially equal to one three hundred and eighty-fourth of a millimeter (1/256 mm×1/384 mm), the expanded image 725 generated by the first double convex converging lens 805 therefore has a maximum height substantially equal to one sixty-fourth of a millimeter and a maximum width substantially equal to one ninety-sixth of a millimeter (¹⁄₆₄ mm×¹⁄₉₆ mm).

Similarly, the expanded image 725, in turn, serves as an object for the second double convex converging lens 810, which generates a further-expanded image 730. The second double convex converging lens 810 preferably is focused on the expanded image 725 and is adapted to project the further-expanded image 730 for a distance W' toward the third double convex converging lens 815. The distance W' is substantially equal to fifty millimeters. As with the first double convex converging lens 805, the distance X' between the second double convex converging lens 810 and the expanded image 725 is calculated via the general lens equation of Equation 1 to be substantially equal to twelve and one-half millimeters. Stated somewhat differently, the second double convex converging lens 810 is displaced from the first double convex converging lens 805 by a total distance substantially equal to sixty-two and one-half millimeters. The further-expanded image 730 also has a size that is substantially equal to a product of the size of the expanded image 725 and a deminiaturization (or magnification) index (not shown) for the second double convex converging lens 810. The deminiaturization index for the second double convex converging lens 810 is calculated to be substantially equal to four (4) via the magnification (or miniaturization) equation of Equation 2. Thus, the further-expanded image 730 generated by the second double convex converging lens 810 has a maximum height substantially equal to one sixteenth of a millimeter and a maximum width substantially equal to one twenty-fourth of a millimeter (¹⁄₁₆ mm×¹⁄₂₄ mm).

The further-expanded image 730 then serves as an object for the third double convex converging lens 815. Preferably being focused on the further-expanded image 730, the third double convex converging lens 815 generates a further-expanded image 735 and is adapted to project the further-expanded image 735 for a distance U' of substantially fifty millimeters substantially toward the fourth double convex converging lens 820. Applying the general lens equation of Equation 1, a distance V' between the third double convex converging lens 815 and the further-expanded image 730 is calculated to be substantially equal to twelve and one-half millimeters. Stated somewhat differently, the third double convex converging lens 815 is displaced from the second double convex converging lens 810 by a total distance substantially equal to sixty-two and one-half millimeters. The further-expanded image 735 also has a size that is substantially equal to a product of the size of the further-expanded image 730 and a deminiaturization (or magnification) index (not shown) for the third double convex converging lens 815. From the magnification (or miniaturization) equation of Equation 2, the deminiaturization index for the third double convex converging lens 815 is calculated to be substantially equal to four (4). Thus, the further-expanded image 735 generated by the third double convex converging lens 815 has a maximum height substantially equal to one-fourth of a millimeter and a maximum width substantially equal to one-sixth of a millimeter (¼ mm×⅙ mm).

In turn, the further-expanded image 735 serves as an object for the fourth double convex converging lens 820, which generates a further-expanded image 740. The fourth double convex converging lens 820 preferably is focused on the further-expanded image 735 and is separated from the further-expanded image 735 by a distance T' of substantially twelve and one-half millimeters. The fourth double convex converging lens 820 preferably is focused on the further-expanded image 735 and is adapted to project the further-expanded image 740 for a distance S' of substantially fifty millimeters substantially toward the fifth double convex converging lens 825. The distance T' between the fourth double convex converging lens 820 and the further-expanded image 735 is calculated via the general lens equation of Equation 1 and is substantially equal to twelve and one-half millimeters. Stated somewhat differently, the fourth double convex converging lens 820 is displaced from the third double convex converging lens 815 by a total distance substantially equal to sixty-two and one-half millimeters. The further-expanded image 740 also has a size that is substantially equal to a product of the size of the further-expanded image 735 and a deminiaturization (or magnification) index (not shown) for the fourth double convex converging lens 820. In accordance with the magnification (or miniaturization) equation of Equation 2, the deminiaturization index for the fourth double convex converging lens 820 is calculated to be substantially equal to four (4). Thus, the further-expanded image 740 generated by the fourth double convex converging lens 820 has a maximum height substantially equal to one millimeter and a maximum width substantially equal to two-thirds of a millimeter (1 mm×⅔ mm).

The further-expanded image 740 then serves as an object for fifth double convex converging lens 825. Preferably being focused on the further-expanded image 740, the fifth double convex converging lens 825 generates a further-expanded image 745 and is adapted to project the further-expanded image 745 for a distance Q' substantially toward the sixth double convex converging lens 830. When the distance Q' is substantially equal to fifty millimeters, a distance R' between the fifth double convex converging lens 825 and the further-expanded image 740 is calculated via the general lens equation of Equation 1 to be substantially equal to twelve and one-half millimeters. Stated somewhat differently, the fifth double convex converging lens 825 is displaced from the fourth double convex converging lens 820 by a total distance substantially equal to sixty-two and one-half millimeters. The further-expanded image 745 also has a size that is substantially equal to a product of the size of the further-expanded image 740 and a deminiaturization (or magnification) index (not shown) for the fifth double convex converging lens 825. The deminiaturization index for the fifth double convex converging lens 825 is calculated via the magnification (or miniaturization) equation of Equation 2 to be substantially equal to four (4). Thus, the further-expanded image 745 generated by the fifth double convex converging lens 825 has a maximum height substantially equal to four millimeters and a maximum width substantially equal to two and two-third millimeters (4 mm×2⅔ mm).

Lastly, the further-expanded image 745 serves as an object for the sixth double convex converging lens 830. Preferably being focused on the further-expanded image 745, the sixth double convex converging lens 830 generates a further-expanded image 750 and is adapted to project the further-expanded image 750 for a distance N' of substantially fifty millimeters substantially toward the first double convex converging lens 910 (shown in FIG. 5B) of the second stage 900. Applying the general lens equation of Equation 1, a distance P' between the sixth double convex converging lens 830 and the further-expanded image 745 is calculated to be substantially equal to twelve and one-half millimeters. Stated somewhat differently, the sixth double convex converging lens 830 is displaced from the fifth double convex converging lens 825 by a total distance substantially equal to sixty-two and one-half millimeters. A size of the further-expanded image 750 is substantially equal to a product of the size of the further-expanded image 745 and a deminiaturization (or magnification) index (not shown) for the sixth double convex converging lens 830. In accordance with the magnification (or miniaturization) equation of Equation 2, the deminiaturization index for the sixth double convex converging lens 830 is calculated to be substantially equal to four (4). Thus, the further-expanded image 750 generated by the sixth double convex converging lens 830 has a maximum height substantially equal to sixteen millimeters and a maximum width substantially equal to ten and two-third millimeters (16 mm×10⅔ mm). Thus, the first stage 800 of the microscope objective 320 has a total deminiaturization (or magnification) index that is substantially equal to a product of the deminiaturization indexes for the six double convex converging lenses 805, 810, 815, 820, 825, and 830, or substantially four thousand and ninety-six (4096), and a total length, as measured from the substantially-reduced image 60 to the further-expanded image 750, of approximately three hundred, seventy-five millimeters (375 mm).

A second stage 900 of the microscope objective 320 is shown in FIG. 5B. The second stage 900 preferably comprises two double convex converging-lenses 910, 920, each of which are substantially in axial alignment with, and in optical communication with, the six double convex converging lenses 805, 810, 815, 820, 825, and 830 of the first stage 800. The first double convex converging lens 910 is disposed substantially between the sixth double convex converging lens 830 (shown in FIG. 5A) of the first stage 800 and the second double convex converging lens 920 of the second stage 900. The first double convex converging lens 910 has a focal length (not shown) of substantially twenty millimeters and includes an object lens surface 930 and an image lens surface 940, each of which preferably has a radius of curvature of substantially twenty millimeters. The second double convex converging lens 920 has a focal length (not shown) of substantially twenty millimeters and includes an object lens surface 950 and an image lens surface 960. The object lens surface 950 and the image lens surface 960 each preferably have a radius of curvature of substantially twenty millimeters, and the second double convex converging lens 920 is disposed substantially between the first double convex converging lens 910 and the lens system 310 of the display system 300.

The further-expanded image 750 generated by the sixth double convex converging lens 830 (shown in FIG. 5A) serves as an object for the first double convex converging lens 910 of the second stage 900. The first double convex converging lens 910 of the second stage 900 preferably is focused on the further-expanded image 750 and generates a further-expanded image 760 from the further-expanded image 750. The first double convex converging lens 910 is adapted to project the further-expanded image 760 for a distance C' substantially toward the second double convex converging lens 910. When the distance C' is substantially equal to fifty millimeters, a distance D' between the first double convex converging lens 910 and the further-expanded image 750 is calculated via the general lens equation of Equation 1 to be substantially equal to thirty-three and one-third millimeters. Stated somewhat differently, the first double convex converging lens 910 of the second stage 900 is displaced from the sixth double convex converging lens 830 (shown in FIG. 5A) of the first stage 800 by a total distance substantially equal to eighty-three and one-third millimeters. The further-expanded image 760 also has a size that is substantially equal to a product of the size of the further-expanded image 750 and a deminiaturization (or magnification) index (not shown) for the first double convex converging lens 910. In accordance with the magnification (or miniaturization) equation of Equation 2, the deminiaturization (or magnification) index for the first double convex converging lens 910 is calculated to be substantially equal to three halves (3⁄2). Thus, the further-expanded image 760 generated by the first double convex converging lens 910 has a maximum height substantially equal to twenty-four millimeters and a maximum width substantially equal to sixteen millimeters (24 mm×16 mm).

Similarly, the further-expanded image 760 serves as an object for the second double convex converging lens 920. Preferably being focused on the further-expanded image 760, the second double convex converging lens 920 generates the restored image 95 and is adapted to project the restored image 95 for a distance A' substantially toward the lens system 310 of the display system 300. The distance A' is substantially equal to fifty millimeters. Applying the general lens equation of Equation 1, a distance B' between the second double convex converging lens 920 and the further-expanded image 760 is calculated to be substantially equal to thirty-three and one-third millimeters. Stated somewhat differently, the second double convex converging lens 920 is displaced from the first double convex converging lens 910 by a total distance substantially equal to eighty-three and one-third millimeters. The restored image 95 also has a size that is substantially equal to a product of the size of the further-expanded image 760 and a deminiaturization (or magnification) index (not shown) for the second double convex converging lens 920. The deminiaturization index for the second double convex converging lens 920 is calculated to be substantially equal to three halves (3⁄2) from the magnification (or miniaturization) equation of Equation 2. As a result, the restored image 95 generated by the second double convex converging lens 920 has a maximum height substantially equal to thirty-six millimeters and a maximum width substantially equal to twenty-four millimeters (36 mm×24 mm), which is substantially equal to the size of the initial image 50. Thus, the second stage 900 of the microscope objective 320 has a total deminiaturization (or magnification) index that is substantially equal to a product of the miniaturization indexes for the first double convex converging lens 910 and the second double convex converging lens 920, or substantially nine fourths (9⁄4) and a total length, as measured from the further-expanded image 750 to the restored image 95, of approximately one hundred, sixty-six and two-third millimeters (166⅔ mm).

The microscope objective 320 as illustrated in FIGS. 5A and 5B therefore has a total length, as measured from the substantially-reduced image 60 to the restored image 95, of approximately five hundred, forty-one and two-third millimeters (541⅔ mm). A total deminiaturization (or magnification) index of the microscope objective 320 is substantially equal to a product of the deminiaturization indexes for the first stage 800 and the second stage 900 or substantially nine thousand, two hundred, and sixteen (9216). As will be appreciated by those skilled in the art, any aberration present on a given lens in the microscope objective 320 can be cancelled out, in whole or in part, by any aberration on a lens adjacent to and succeeding the given lens. Such an aberration also can be remedied by the use of a divergence lens (not shown). Such a divergence lens preferably has a radius of curvature substantially equal to a radius of curvature of the given lens and is substantially axially aligned with the given lens. The divergence lens is disposed between the given lens and a lens adjacent to and preceding the given lens. Further, one or more of the lenses in the microscope objective 320 can be adjustably mounted such that the distance between consecutive lenses can be increased and/or decreased, preferably by up to substantially twenty percent of the distance. For example, the adjustable mounting for each lens can comprise one or more individual adjustment screws associated with a gear-and-track system in a manner that is well-known in the art. Since FIGS. 5A and 5B provide only one illustrative example of the microscope objective 320, it will likewise be recognized that the construction of the microscope objective 320 can be altered, as desired, by modifying, for example, the quantity and/or characteristics of one or more of the individual lenses and/or the distance between two or more adjacent lenses. By using such an alternate construction, the overall characteristics of the microscope objective 320, such as the total deminiaturization index or the total length, also may be changed.

Returning to FIG. 4, the display system 300 further is adapted to visibly present the visibly-presentable image 90. For example, the display system 300 can comprise a projector 340 and a viewing screen 350 as shown in FIG. 4. In this embodiment, the lens system 310 preferably comprises a projection lens system 360 for resizing the restored image 95 and for projecting the visibly-presentable image 90 on the viewing screen 350. The projection lens system 360 can be physically separate from the lens system 310 and/or can be substantially incorporated into the lens system 310, as shown in FIG. 4. For purposes of illustration, the projection lens system 360 has been depicted as a single element positive lens; however, it should be understood that a multiple element lens system can be used. Being disposed substantially between the filament 110 substantially adjacent to the distal end region 130 of the fiber optic cable 100 and the viewing screen 350, the projection lens system 360 is adapted to be in optical communication with the microscope objective 320 such that the restored image 95 generated by the microscope objective 320 is optically communicated to the projection lens system 360. Upon being generated by the microscope objective 320, the restored image 95 serves as an object for the projection lens system 360. The projection lens system 360 preferably is focused on the restored image 95 and generates the visibly-presentable image 90 from the restored image 95.

Being directed substantially toward the viewing screen 350, the projection lens system 360 projects the restored image 95 onto a viewing screen 350. The viewing screen 350 can be separate from and/or substantially integral with the display system 300 and can comprise any type of viewing screen. The viewing screen 350 preferably is substantially in axial alignment with the projection lens system 360 and is disposed substantially at a predetermined distance from the projection lens system 360. Although the viewing screen 350 can be movable relative to the projection lens system 360, the projection lens system 360 has an adjustable focal length and/or is capable of adjusting the focus and/or a size of the visibly-presentable image 90 as presented on the viewing screen 350. The projection lens system 360 further can be adapted to increase (or decrease) the size of the visibly-presentable image 90 by, for example, zooming in (or out). Thereby, the size of the visibly-presentable image 90 can be greater than, less than, or substantially equal to the size of the restored image 95.

The projector 340 is capable of projecting the visibly-presentable image 90 onto the viewing screen 350 under certain circumstances, such as when the predetermined distance between the viewing screen 350 and the projector 340 is small and/or when ambient light conditions surrounding the display system 300 are low. However, with, for example, larger predetermined distances and/or high ambient light conditions, an illumination system (not shown) can be included in the projector 340 to momentarily and/or continuously enhance the visibly-presentable image 90 as projected onto the viewing screen 350. Like the source of illumination for the camera 200, the illumination system also can be adapted to operate without a power source. For example, such a illumination system can comprise a system, such as a mirror, for redirecting light from another natural and/or artificial source, external to the projector 340, and substantially toward the viewing screen 350. Alternatively, or in conjunction with an unpowered illumination system, the illumination system can comprise an incandescent or halogen lightbulb, a floodlight, and/or any other type of illumination or lighting source. To facilitate the enhancement of the visibly-presentable image 90, the illumination system can be integral to, and/or separate or separable from, the display system 300 and/or the system 10 (shown in FIG. 1).

Figure 6:
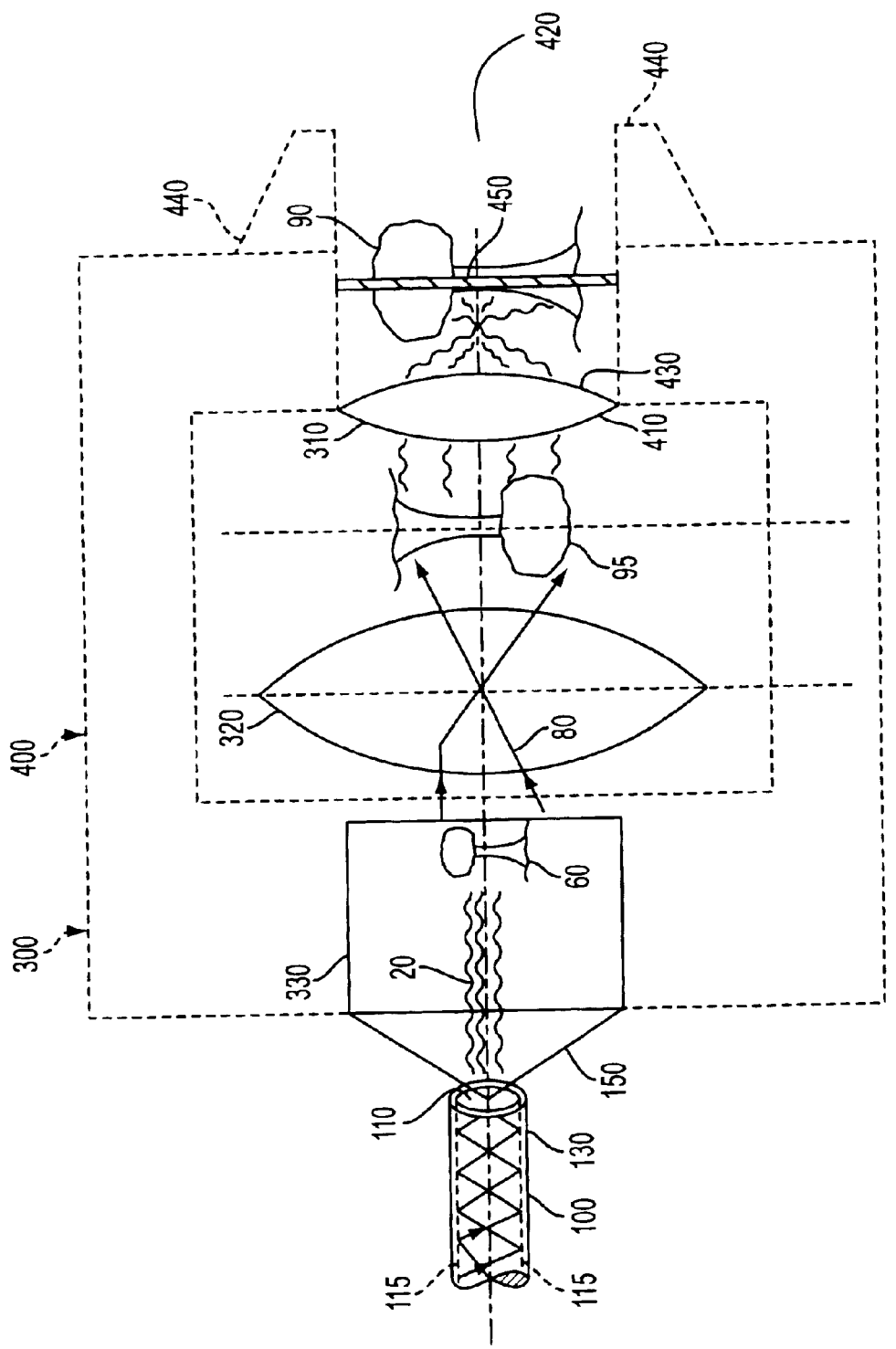
FIG. 6 is a detailed view of a second embodiment of the display system of FIG. 1.

Alternatively, FIG. 6 provides another embodiment of the display system 300 for more directly viewing the visibly-presentable image 90. In this embodiment, the lens system 310 preferably comprises an exposed projection lens system 410 that is adapted to visibly present the visibly-presentable image 90 after resizing the restored image 95. The projection lens system 410 can be physically separate from the lens system 310 and/or can be substantially incorporated into the lens system 310, as shown in FIG. 6. For purposes of illustration, the projection lens system 410 has been depicted as a single element positive lens; however, it should be understood that a multiple element lens system can be used. The projection lens system 410 is adapted to be in optical communication with the microscope objective 320. The restored image 95 generated by the microscope objective 320 is optically communicated to the projection lens system 410 and serves as an object for the projection lens system 410. Preferably being focused on the restored image 95, the projection lens system 410 is adapted to generate the visibly-presentable image 90 from the restored image 95 and to visibly present the visibly-presentable image 90.

The display system 300 preferably is substantially enclosed within the housing 400. An opening 420 for exposing the lens system 310 is formed in the housing 400. The projection lens system 410 can be substantially disposed within the opening 410 as shown in FIG. 6, extend outside of the housing 400, and/or recessed inside the housing 400. Since the opening 420 is substantially in axial alignment with the lens system 310, the visibly-presentable image 90 can be viewed more directly by looking through the opening 420 and substantially toward an image surface 430 of the projection lens system 410. To facilitate viewing of the visibly-presentable image 90, the housing 400 may include one or more light shields 440 substantially adjacent to the image surface 430 and/or a translucent viewing screen 450, such as a recticle, can be placed within or adjacent to the opening 420. The translucent viewing screen 450 is substantially axially aligned with the projection lens system 410 and is disposed substantially at a predetermined distance from the projection lens system 410. The translucent viewing screen 450 also can be substantially disposed within the opening 420 as shown in FIG. 6 and/or positioned inside or outside the housing 400. Although the translucent viewing screen 450 can be movable relative to the projection lens system 410, the projection lens system 410 has an adjustable focal length and/or is capable of adjusting the focus and/or a size of the visibly-presentable image 90 as presented on the translucent viewing screen 450. The projection lens system 410 further can be adapted to increase (or decrease) the size of the visibly-presentable image 90 by, for example, zooming in (or out). The size of the visibly-presentable image 90 therefore can be greater than, less than, or substantially equal to the size of the restored image 95. Alternatively, the display system 300 can comprise any type of display system, such as a video monitor and/or a liquid crystal diode display, and can be coupled with the projection lens system 410 of the display system 300 and adapted to visibly present the visibly-presentable image 90 through the use of, for example, a video camera.

In operation, a lens system 210 of a camera 200 for a system 10 for transmitting images, returning to FIG. 2, is adjustably directed and/or redirected substantially toward one or more objects 40 to be captured and/or viewed. The objects 40, which can include still and/or moving objects, are illuminated with natural and/or artificial light, some of which may be provided by a source of illumination (not shown) associated with the camera 200 and/or the system 10. The objects 40 reflect and/or otherwise emit natural and/or artificial light signals 30, and some of the light signals 30 are directed substantially toward, and are received by, the lens system 210 of the camera 200. Upon receipt of the light signals 30, the lens system 210 can focus and/or zoom in (or out) on one or more of the objects 40 and produces a substantially-reduced image 60 of the objects 40, preferably via separate and/or substantially integrated inverted microscope objective 220.

To optimize image quality, the lens system 210 generates an initial image 50 of the objects 40 and communicates the initial image 50 to the inverted microscope objective 220, preferably increasing and/or decreasing a size of the initial image 50 such that the initial image 50 substantially spans an entire usable area of the inverted microscope objective 220. The lens system 210 can have a magnification and/or miniaturization index that is adjustable to help ensure that the entire usable area of the inverted microscope objective 220 is substantially spanned by the initial image 50. Upon receiving the initial image 50 from the lens system 210, the inverted microscope objective 220 focuses on the initial image 50, which serves as an object for the inverted microscope objective 220. The inverted microscope objective 220 then further intensifies the initial image 50 to produce optical signals 70 comprising the substantially-reduced image 60. The substantially-reduced image 60 comprises an entire image of the objects 40 and is intensified such that the substantially-reduced image 60 has a size that is substantially between one-thousandth and one-millionth of the size of the initial image 50. Substantially continuously receiving the light signals 30 from the one or more moving and/or still objects 40, the lens system 210 substantially continuously updates the substantially-reduced image 60 such that the substantially-reduced image 60 appears in motion.

The optical signals 20 comprising the substantially-reduced image 60 in its entirety are communicated in real-time from the camera 200 to a display system 300 (shown in FIG. 1) via a filament 110 of a fiber optic cable 100. When the camera 200 is coupled with a proximal end region 120 of the fiber optic cable 100, the lens system 210 and/or the inverted microscope objective 220 is directly and/or indirectly optically coupled with, and in optical communication with, the filament 110 substantially adjacent to the proximal end region 120. For example, once generated, the optical signals 70 comprising the substantially-reduced image 60 can be optically communicated to a collimating and focusing system 230, which optically couples the lens system and/or the inverted microscope objective 220 with the filament 110 substantially adjacent to the proximal end region 120. Upon receiving the optical signals 70, the collimating and focusing system 230, using a system of prisms (not shown), converts the substantially dispersive optical signals 70 into the substantially aligned and substantially parallel optical signals 20. The optical signals 20 then can be communicated to an optical coupler 140. The optical coupler 140 optically couples the collimating and focusing system 230 with the filament 110 substantially adjacent to the proximal end region 120. Upon receipt of the optical signals 20, the optical coupler 140 determines a preselected angle of incidence (not shown) of the optical signals 20 upon entering the filament 110 substantially adjacent to the proximal end region 120. The angle of incidence is determined in accordance with Snell's law:

$$n_1 \sin \theta_1 = n_2 \sin \theta_2 \quad \text{Equation 3}$$

where $n_1$ and $n_2$ are the index of refraction for a first material and a second material, respectively, $\theta_1$ is the angle of incidence of light travelling through the first material toward the second material, and $\theta_2$ is the angle of refraction of the light as the light enters the second material. In accordance with Equation 3, the angle of incidence of the optical signals 20 upon entering the filament 110 may be adjusted via the collimating and focusing system 230 and/or the optical coupler 140 such that the optical signals 20 are reflected internally by the clad 115 surrounding the filament 110. To achieve internal reflections within the filament 110, the preselected angle of incidence is selected such that the optical signals 20 enter the filament 110 substantially adjacent to the proximal end region 120 at an angle of substantially forty-five degrees.

Upon entering the filament 110, the optical signals 20 are refracted in accordance with Equation 3 based in part upon the index of refraction of a material forming the filament 110. The optical signals 20 also may be subjected to a non-linear phenomenon upon entering the filament 110 and coming into contact with a core 116 and the clad 115 of the filament 110. The non-linear phenomenon can occur because the optical signals 20 comprising the substantially-reduced image 60 have certain qualities, such as high energy and/or high density, as a result of being highly intensified by the lens system 210 of the camera 200. When the optical signals 20 contact the core 116 and the clad 115 of the filament 110, highly-excited particles (not shown) are produced. Although the optical signals 20 travel through the filament 100 at a velocity limited by the speed of light, it is believed that the highly-excited particles are capable of moving at velocities exceeding the speed of light in accordance with the theory underlying Brownian motion. The highly-excited particles are capable of forming one or more waves (not shown) that can have a feedforward effect inside the filament 110 and create motions of non-dispersive light, comprising a plurality of velocities each having an altered wavelength. The plurality of velocities form a plurality of signals that fold back into one another, forming a complex wave (not shown) of a fractal type. The complex wave behaves substantially in accordance with the equation:

$$Z^2 + C = {}^*\text{some } E \quad \text{Equation 4}$$

where Z is a complex function that includes energy and density, C is a complex number, and *some E is a variation of energy that grows and feedsback into the complex function Z. The application of Equation 4 can depend upon several factors, such as the miniaturization index of the lens system 210 and/or the inverted microscope objective 220, the core diameter M (shown in FIG. 1) of the filament 110, and/or the angle of incidence of the optical signals 20 into the filament 110. The complex wave can comprise a plurality of fractal texture colors that represents or imbues a color content of the initial image 50. Stated somewhat differently, the complex wave comprises the initial image 50 and can be deminiaturized to reestablish the initial image 50. In contrast to the traditional understanding in the art, no separation of carrier and signal exists in the complex wave. The carrier and the signal substantially become a single entity.

The non-linear phenomenon also can be influenced by a dispersion within the filament 110 of the fiber optic cable 100. Dispersion in general is defined to be a temporal spreading of a light signal within an optical waveguide. Applied to the present invention, the dispersion of the optical signals 20 within the filament 110 is substantially in proportion to a non-linear refractive index of the filament 110 and becomes substantially sequential and/or repetitive continuously as the highly-excited particles encounter the non-linear refractive index of the filament 110. A natural tendency for the optical signals 20 to disperse is, in whole or in part, compensated for by the intensity of the highly-excited particles and/or by a ratio of a core diameter M to a length L (shown in FIG. 1) of the fiber optic cable 100. Further, depending upon the length L of the fiber optic cable 100, the optical signals 20 can be received, amplified, and re-transmitted by one or more optical repeaters (not shown), as needed, to enhance the optical signals 20 and/or to preserve image quality as the optical signals 20 travel from the camera 200 to the display system 300 as shown in FIG. 4.

The display system 300 is coupled with a distal end region 130 of the fiber optic cable 100. The display system 300 includes a lens system 310 that is directly and/or indirectly optically coupled with, and in optical communication with, the filament 110 substantially adjacent to the distal end region 130 of the fiber optic cable 100. For example, the filament 110 substantially adjacent to the distal end region 130 can be indirectly coupled with the lens system 310 via an optical coupler 150. Upon arrival at the display system 300, the optical signals 20 comprising the substantially-reduced image 60 travel from the filament 110 substantially adjacent to the distal end region 130 to the optical coupler 150. The optical coupler 150 receives the optical signals 20 and conforms the optical signals 20 during a change in medium from the filament 110 to the lens system 310. The optical signals 20 can be further conformed by a collimating and focusing system 330. The collimating and focusing system 330 preferably is disposed between the lens system 310 and the optical coupler 150 and/or the filament 110 substantially adjacent to the distal end region 130. Upon receiving the optical signals 20, the collimating and focusing system 330 produces optical signals 80 that are substantially aligned and focused on the lens system 310 of the display system 300. Since the optical signals 20 emitted from the filament 110 can exhibit non-linear behavior, the collimating and focusing system 330 preferably has more prismatic sophistication than the collimating and focusing system 230 of the camera 200 to substantially axially align the optical signals 80 with the lens system 310. The additional prismatic sophistication can comprise, for example, approximately two or three additional prisms.

The use of the collimating and focusing system 330 with additional prismatic sophistication can prove advantageous due to the formation of the complex wave within the filament 110 during transmission of the optical signals 20 comprising the substantially-reduced image 60. Since it is believed that the highly-excited particles produced by the optical signals 20 in the filament 110 are capable of moving at velocities that exceed the speed of light, the complex wave formed by the complex particles can arrive at the distal end region 130 of the fiber optic cable 100, and therefore possibly the lens system 310, before the optical signals 20. If the complex wave therefore is permitted to be optically communicated to the lens system 310, the lens system 310 will magnify the complex wave but may not be able to locate the substantially-reduced image 60 at that time because the optical signals 20 travel at a slower velocity than the complex wave. However, the complex wave, although confined while travelling within the filament 110, substantially disperses upon being emitted by the filament 110 substantially adjacent to the distal end region 130 and is not received by the collimating and focusing system 330. Not being obscured by the complex wave, the substantially-reduced image 60 is received in its original form by the collimating and focusing system 330, which converts the optical signals 20 into the substantially parallel and substantially optically aligned optical signals 80.

Once communicated to the lens system 310, the optical signals 80 serve as an object for the lens system 310 and are deminiaturized to produce a visibly-presentable image 90 from the substantially-reduced image 60. The lens system 310 preferably produces the visibly-presentable image 90 via a separate and/or substantially integrated microscope objective 320. To optimize image quality, the microscope objective 320 generates a restored image 95 of the objects 40. The restored image 95 preferably has a size that is substantially between one thousand and one million times of the size of the substantially-reduced image 60 such that the size of the restored image 95 is substantially equal to the size of the initial image 50 produced by the lens system 210 of the camera 200. The microscope objective 320 then communicates the restored image 95 to the lens system 310. The restored image 95 preferably substantially spans an entire usable area of the lens system 310 for improved resolution of the visibly-presentable image 90 generated by the lens system 310. The microscope objective 320 can have a deminiaturization (or magnification) index that is adjustable to help ensure that the entire usable area of the lens system 310 is substantially spanned by the restored image 95. The restored image 95 generated by the microscope objective 320 and the visibly-presentable image 90 each comprise an entire image of the objects 40. Since the lens system 210 of the camera 200 substantially continuously updates the substantially-reduced image 60, the restored image 95 generated by the microscope objective 320 and the visibly-presentable image 90 generated by the lens system 310 of the display system 300 also are substantially continuously updated in real-time. As a result, the restored image 95 and the visibly-presentable image 90 each can appear in motion.

Upon generating the visibly-presentable image 90, the lens system 310 visibly presents the visibly-presentable image 90. For example, the lens system 310 can comprise a projection lens system 360 for projecting the visibly-presentable image 90 on a viewing screen 350 as shown in FIG. 4. By using the restored image 95 as an object, the projection lens system 360 generates the enlarged object 90 and projects the enlarged object 90 by a predetermined distance substantially toward the viewing screen 350. The visibly-presentable image 90 thereby is visibly presented and can be viewed on the viewing screen 350. To permit the viewing screen 350 to be positionable as desired, the lens system 310 is adjustable. The lens system 310 can focus the visibly-presentable image 90 on the viewing screen 350 and/or can increase (or decrease) a size of the visibly-presentable image 90 by, for example, zooming in (or out) on a relevant portion of the visibly-presentable image 90. An illumination system (not shown) within the display system 300 can be activated to further enhance the visibly-presentable image 90 as necessary.

An alternative embodiment of the display system 300 is illustrated in FIG. 6. In this embodiment, the visibly-presentable image 90 can be viewed more directly by looking substantially toward the lens system 310. The lens system 310 preferably comprises an exposed projection lens system 410 that generates the visibly-presentable image 90 from the restored image 95 and visibly presents the visibly-presentable image 90. Using the restored image 95 as an object, the projection lens 410 generates the visibly-presentable image 90 and projects the visibly-presentable image 90 from an image surface 430. The visibly-presentable image 90 is visibly presented and can be viewed by looking substantially toward the image surface 430 of the projection lens system 410. The visible presentation of the visibly-presentable image 90 is facilitated by when the projection lens system 410 is adjustable. The projection lens system 410 can focus the visibly-presentable image 90 and/or can increase (or decrease) a size of the visibly-presentable image 90 by, for example, zooming in (or out) on a relevant portion of the visibly-presentable image 90. To further facilitate the visibly presentation of the visibly-presentable image 90, one or more light shields 440 and/or a translucent viewing screen 450, such as a recticle, can be provided adjacent to the image surface 430 of the projection lens 410.

Figure 7:
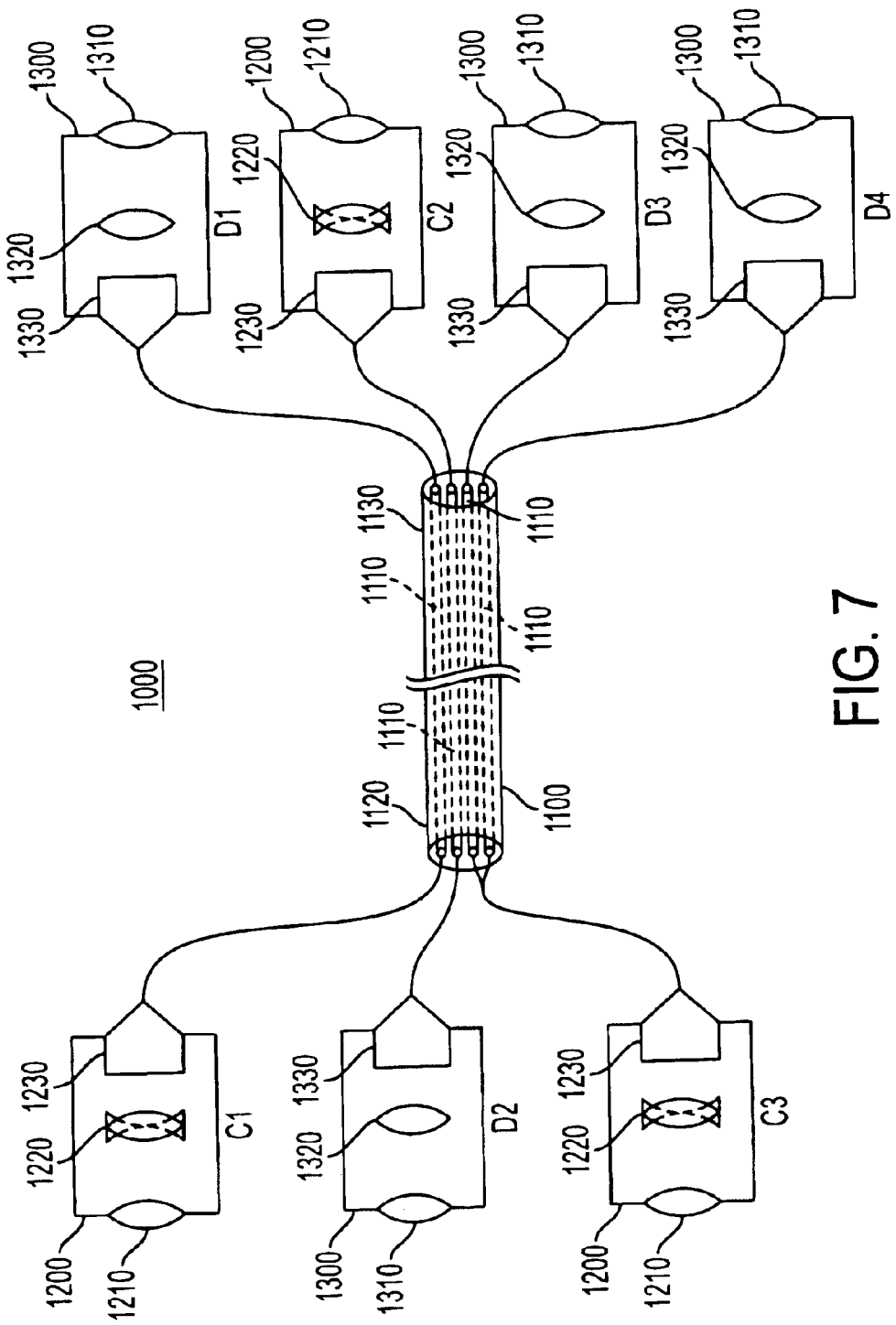
FIG. 7 is an illustration of a second preferred embodiment of a system for transmitting images in accordance with the present invention.

Those skilled in the art further will appreciate that the system 1000 of the present invention can be adapted to include a fiber optic cable 1100, one or more cameras 1200, and one or more display systems 1300 as shown in FIG. 7. As more fully described above, the fiber optic cable 1100 can comprise any type of fiber optic cable that is well-known in the art. The fiber optic cable 1100 has one or more filaments 1110 for transmitting optical signals 20 (shown in FIG. 2) and proximal and distal opposite end regions 1120, 1130. Any additional filaments may be unused and/or employed to transmit other optical signals, such as transmitting (e.g. redundant) images from one of the cameras 1200 to a plurality of display systems 1300.

To facilitate substantially simultaneous communication of a plurality of modes and/or rays of light through the filament 1110, the fiber optic cable 1100 preferably is of a "multimode" type. In such a "multimode" type of fiber optic cable 1100, each filament 1110 that is used to transmit images has a core diameter M (shown in FIG. 1) that is larger than a core diameter in a "single mode" type of fiber optic cable to avoid excess heat being dissipated inside the filament 1110 when the optical signals 20 (shown in FIG. 2) have certain qualities such as high energy and/or high density. The "multimode" type of fiber optic cable 1100 preferably has a fiber size of 200/250, where the first number represents the core diameter M in microns and the second number represents a diameter of a clad 115 (shown in FIG. 2) around the core in microns. However, it will be appreciated that the filament 1110 of the fiber optic cable 1100 can comprise any commercially-available fiber size, such as 62.5/125, 50/125, 100/140, or 110/125, for example, as heat dissipation becomes less of a consideration and/or by varying the chemistry of the material, such as plastic or glass, used to form the core. As necessary, one or more optical repeaters (not shown) for receiving, amplifying, and re-transmitting the optical signals 20 may be coupled with, and in optical communication with, one or more of the filaments 1110.

The one or more cameras 1200 each can comprise any type of camera as more fully described above and illustrated in FIG. 2. Each of the cameras 1200 has a lens system 1210 and is coupled with either the proximal end region 1120 or the distal end region 1130 of the fiber optic cable 1100. The lens system 1210 for each of the cameras 1200 can comprise any type of lens system and is adapted for receiving light signals 30 (shown in FIG. 1) from one or more still and/or moving objects 40 (shown in FIG. 2). For purposes of illustration, each of the lens systems 1210 as shown in FIG. 7 has been depicted as a single element positive lens; however, it should be understood that a multiple element lens system can be used. The lens system 1210 is adapted to produce a substantially-reduced image 60 (shown in FIG. 2) of the objects 40 and is adjustable to, for example, focus and/or zoom in (or out) on one or more of the objects 40. The lens system 1210 is optically coupled with at least one of the one or more filaments 1110. To facilitate optical coupling, the lens system 1210 of each camera 1200 is substantially in axial alignment with the one or more relevant filaments 1110 to provide a substantially direct optical path for the light signals travel from the lens system 1210 to the one or more relevant filaments 1110. The lens system 1210 of each camera 1200 can be coupled with the one or more relevant filaments 1110 via an optical coupler (not shown) and/or a collimating and focusing system 1230.

As more fully described above, the lens system 1210 of each camera 1200 preferably further includes an inverted microscope objective 1220. The inverted microscope objective 1220 can be physically separate from the lens system 1210, as shown in FIG. 7, and/or can be substantially incorporated into the lens system 1210. Each lens system 1210 is optically coupled with the one or more relevant filaments 1110 via the inverted microscope objective 1220 such that an initial image 50 (shown in FIG. 2) of the objects 40 generated by each lens system 1210 is optically communicated to the inverted microscope objective 1220. To optimize image quality, each inverted microscope objective 1220 is substantially axially aligned with the associated lens system 1210 and is adjustably disposed substantially a predetermined distance from the associated lens system 1210. Although each element in this embodiment of the present invention is described as being substantially axially aligned, the elements preferably are precisely in axial alignment. For each camera 1200, the predetermined distance is selected such that the inverted microscope objective 1320 is focused on the initial image 50 generated by the lens system 1210. Using the initial image 50 as an object, each inverted microscope objective 1220 is adapted to further intensify the initial image 50, producing the substantially-reduced image 60 that has a size that is substantially between one-thousandth and one-millionth of a size of the initial image 50. Each inverted microscope objective 1220 is capable of optically communicating the optical signals 20 that comprise the substantially-reduced image 60 to the one or more relevant filaments 1110 of the fiber optic cable 1100.

The one or more display systems 1300 each can comprise any type of display system as more fully described above and illustrated in FIGS. 4 and 6, and each of the display systems 1300 are coupled with either the proximal end region 1120 or the distal end region 1130 of the fiber optic cable 1100. Each of the display systems 1300 has a lens system 1310 for receiving the optical signals 20 comprising the substantially-reduced image 60 from the lens system 1210 of one or more relevant cameras 1200 and for generating a visibly-presentable image 90 (shown in FIG. 4) from the substantially-reduced image 60. For purposes of illustration, each lens system 1310 in FIG. 7 has been depicted as a single element positive lens; however, it should be understood that a multiple element lens system can be used. The lens system 1310 for each display system 1300 is optically coupled with, and adapted for optical communication with, the lens system 1210 of the one or more relevant cameras 1200 via the one or more relevant filaments 1110 of the fiber optic cable 1100. To facilitate optical coupling, the lens system 1310 of each display system 1300 and the one or more relevant filaments 1110 preferably are substantially in axial alignment to provide a substantially direct optical path for the optical signals 20. The lens system 1310 of each display system 1300 can be coupled with the one or more relevant filaments 1110 via an optical coupler and/or a collimating and focusing system 1330. As more fully described above, each of the display systems 1300 further is adapted to visibly present the visibly-presentable image 90. The display systems 1300 each can comprise any type of display system, such as, for example, a projector 340 for displaying the visibly-presentable image 90 on a viewing screen 350 as shown in FIG. 4 and/or a display system for more directly viewing the visibly-presentable image 90 as shown in FIG. 6.

The lens system 1310 of each display system 1300 preferably further includes a microscope objective 1320 as more fully described above. The microscope objective 1320 can be physically separate from the lens system 1310, as shown in FIG. 7, and/or can be substantially incorporated into the lens system 1310. Each lens system 1310 is optically coupled with the one or more relevant filaments 1110 via the microscope objective 1320 such that the substantially-reduced image 60 emitted by the relevant filaments 1110 is optically communicated to the microscope objective 1320. To optimize image quality, each microscope objective 1320 is substantially axially aligned with the relevant filaments 1110 and/or the associated lens system 1310 and is adjustably disposed substantially a predetermined distance from the relevant filaments 1110. For each display system 1300, the predetermined distance is selected such that the microscope objective 1320 is focused on the substantially-reduced image 60 emitted by the relevant filaments 1110. Using the substantially-reduced image 60 as an object, each microscope objective 1320 is adapted to deminiaturize the substantially-reduced image 60, producing a restored image 95 (shown in FIG. 4) that has a size that is substantially between one thousand and one million times the size of the substantially-reduced image 60. Each microscope objective 1320 is capable of optically communicating the restored image 95 to the lens system 1310 of the display system 1300 for use as an object by the lens system 1310 for generating and/or visibly displaying the expanded image 90.

In operation, the lens system 1210 of one or more cameras 1200 of the system 1000 for transmitting images each is directed substantially toward one or more still and/or moving objects 40 (shown in FIG. 2) to be captured and/or viewed as more fully described above. Each lens system 1210 can be substantially directed toward objects 40 that are substantially the same as and/or different from the objects 40 toward which the lens system 1210 for each of the other cameras 1200 are substantially directed. Some of light signals 30 (shown in FIG. 2) that are reflected and/or emitted by the objects 40 are directed substantially toward, and received by, the lens system 1210 of one or more relevant cameras 1200. Upon receipt of the light signals, the lens system 1210 for each of the relevant cameras 1200 can independently and/or jointly focus and/or zoom in (or out) on the objects 40 and produces a substantially-reduced image 60 of the objects 40. The substantially-reduced image 60 preferably is produced via separate and/or substantially integrated inverted microscope objective 1220. To optimize image quality, each lens system 1210 generates an initial image 50 (shown in FIG. 2) of the objects 40 and communicates the initial image 50 to the inverted microscope objective 1220, preferably increasing and/or decreasing a size of the initial image 50 such that the initial image 50 substantially spans an entire usable area of the inverted microscope objective 1220. Each lens system 1210 has a magnification and/or miniaturization index that is adjustable to help ensure that the entire usable area of the inverted microscope objective 1220 is substantially spanned or flooded by the initial image 50. The inverted microscope objective 1220 of each of the relevant lens systems 1210 focuses on the initial image 50. Then, using the initial image 50 as an object, the inverted microscope objective 1220 of each of the relevant lens systems 1210 further intensifies the initial image 50 to produce the substantially-reduced image 60, having a size that is substantially between one-thousandth and one-millionth of the size of the initial image 50.

Each substantially-reduced image 60, once generated, is communicated in its entirety from the lens system 1210 of each relevant camera 1200 to the lens system 1310 of one or more relevant display systems 1300 via one or more relevant filaments 1110 of a fiber optic cable 1100. The cameras 1200 each are coupled with a proximal or distal opposite end region 1120, 1130 of the fiber optic cable 1100; whereas, each of the one or more display systems 1300 is coupled with the end region 1120, 1130 opposite the end region 1120, 1130 to which the relevant camera 1200 is coupled. To facilitate optical communication between the lens system 1210 of each camera 1200 and each relevant filament 1110, optical signals 70 (shown in FIG. 2) comprising each substantially-reduced image 60 are first substantially aligned with the relevant filament 1110 and focused by a collimating and focusing system 1230. The substantially aligned and focused optical signals 20 (shown in FIG. 2) then are communicated to the relevant filament 1110 via an optical coupler (not shown). Depending upon a length of the fiber optic cable 1100, the optical signals 20 can be enhanced by one or more optical repeaters (not shown), as needed, to preserve image quality as the optical signals travel from the relevant camera 1200 to each of the relevant display systems 1300.

Upon arrival at the relevant display systems 1300, the optical signals 20 comprising the substantially-reduced image 60 travel from the relevant filament 1110 of the fiber optic cable 1100 to a collimating and focusing system 1330 via an optical coupler (not shown). Upon receiving the optical signals 20, the collimating and focusing system 1330 produces optical signals 80 (shown in FIG. 4) that are substantially aligned and focused on a lens system 1310 of each relevant display system 1300. The optical signals 80 comprising the substantially-reduced image 60 are communicated to the lens system 1310 of each relevant display system 1300, which, in turn, deminiaturizes the substantially-reduced image 60 to produce a visibly-presentable image 90. Each lens system 1310 preferably produces the visibly-presentable image 90 via separate and/or substantially integrated microscope objective 1320. Each microscope objective 1320 focuses on the substantially-reduced image 60. To optimize image quality, each microscope objective 1320, using the substantially-reduced image 60 as an object, generates a restored image 95, which preferably has a size that is substantially between one thousand and one million times of the size of the substantially-reduced image 60. Thereby, the size of the restored image 95 is substantially equal to the size of the initial image 50 produced by the lens system 1210 of the relevant camera 1200. The microscope objective 1320 of each relevant display system 1300 then communicates the restored image 95 to the lens system 1310, preferably sizing the restored image 95 such that the restored image 95 substantially spans or floods an entire usable area of the lens system 1310 for improved resolution of the visibly-presentable image 90. Stated somewhat differently, the microscope objective 320 for each relevant display system 1300 has a deminiaturization (or magnification) index that is adjustable to help ensure that the entire usable area of the lens system 1310 is substantially spanned or flooded by the restored image 95.

Upon receiving the restored image 95 from the microscope objective 1320, the lens system 1310 of each relevant display system 1300 focuses on the restored image 95. Using the restored image 95 as an object, the lens system 1310 of each relevant display system 1300 generates the visibly-presentable image 90. The visibly-presentable image 90 then is visibly presented by the lens system 1310 of each of the relevant display systems 1300. For example, after focusing and/or resizing the restored image 95, each lens system 1310 can project the visibly-presentable image 90 on a viewing screen 350 (shown in FIG. 4). As shown in FIG. 6, the visibly-presentable image 90 alternatively can be viewed more directly by looking substantially toward an image surface 430 of the lens system 1310. To facilitate viewing of the visibly-presentable image 90, one or more light shields 440 and/or a translucent viewing screen 450, such as a recticle, can be provided on each relevant display system 1300, adjacent to the image surface 420 of the lens system 1310. The lens system 1300 of each relevant display system 1300 further can be adjustable to aid in the visible presentation of the visibly-presentable image 90.

For example, the system 1000 can comprise two cameras C1 and C2 and two display systems D1 and D2 as shown in FIG. 7. The camera C1 and the display system D2 each are coupled with the proximal end region 1120 of the fiber optic cable 1100; whereas, the camera C2 and the display system D1 each are coupled with the distal end region 1130 of the fiber optic cable 1100. The lens system 1210 of the camera C1 is optically coupled with, and is in optical communication with, the lens system 1310 of the display system D1 via a first filament 1110 of the fiber optic cable 1100. Similarly, the lens system 1210 of the camera C2 is optically coupled with, and is in optical communication with, the lens system 1310 of the display system D2 via a second filament 1110 of the fiber optic cable 1100. Through the use of such a system 1000, the camera C1 is directed substantially toward a first user (not shown) and creates a real-time image of the first user. A second user (not shown) can view the real-time image of the first user on the display system D1 while the camera C2 is directed substantially toward the second user. A real-time image of the second user is generated by the camera C2 and communicated to the display system D2 for viewing by the first user. Thereby, the first user and the second user can substantially simultaneously view real-time still and/or moving images of each other.

Another illustrative example of the use of the system 1000 of the present invention comprises a combination of one camera C3 and two display systems D3 and D4 as shown in FIG. 7. The camera C3 is coupled, for example, with the proximal end region 1120 of the fiber optic cable 1100, and the display systems D3 and D4 each are coupled with the distal end region 1130 of the fiber optic cable 1100. The lens system 1210 of the camera C3 is optical coupled with, and is in optical communication with, the lens system 1310 of the display system D3 via a first filament 1110 of the fiber optic cable 1100. The lens system 1210 of the camera C3 also is optical coupled with, and is in optical communication with, the lens system 1310 of the display system D4 via a second filament 1110 of the fiber optic cable 1100. Alternatively, the lens system 1210 of the camera C3 can be optically coupled with, and in optical communication with, the lens system 1310 of the display system D3 and the lens system 1310 of the display system D4 both via the first filament 1110 of the fiber optic cable 1100. In use, the camera C3 is directed substantially toward one or more objects 40 (shown in FIG. 2) and creates a real-time initial image 50 (shown in FIG. 2) of the objects 40. Optical signals 20 (shown in FIG. 2) comprising the real-time initial image 50 are optically split and intensified to form two substantially-reduced images. One substantially-reduced image is simultaneously optically communicated in real-time to the display system D3; the other substantially-reduced image substantially-reduced image is simultaneously optically communicated in real-time to the display system D4. The optical signals 20 can be optically split substantially adjacent to the proximal end region 1120 of the fiber optic cable 1100 such that two filaments 1110 are used to communicate the optical signals, or the optical signals 20 can be optically split substantially adjacent to the distal end region 1130 of the fiber optic cable 1100. When the optical signals 20 are optically split substantially adjacent to the distal end region 1130, one filament 1110 is used to communicate the optical signals 20. Thereby, the real-time initial image 50 of the objects 40 generated by a single camera C3 can be visibly presented substantially simultaneously and in real-time on two separate display systems D3 and D4.

As a last illustration of the system 1000 for transmitting images, a lens system 1310 for a display system 1300 can be optically coupled with, and in optical communication with, a lens system 1210 of each of a plurality of cameras 1200. For example, as shown in FIG. 7, the camera C1 and the camera C3 each are coupled with the proximal end region 1120 of the fiber optic cable 1100, and the display system D1 is coupled with the distal end region 1130 of the fiber optic cable 1100. The lens system 1210 of the camera C1 is optical coupled with, and in optical communication with, the lens system 1310 of the display system D1 via a first filament 1110 of the fiber optic cable 1100. The lens system 1210 of the camera C3 also is optical coupled with, and in optical communication with, the lens system 1310 of the display system D1 via a second filament 1110 of the fiber optic cable 1100. Alternatively, the lens system 1310 of the display system D1 can be optically coupled with, and in optical communication with, the lens system 1210 of the camera C1 and the lens system 1210 of the camera C3 both via the first filament 1110 of the fiber optic cable 1100. Thereby, when the camera C1 and the camera C3 each are adapted to generate a substantially-reduced image 60, the substantially-reduced image 60 generated by the camera C1 can be superimposed upon the substantially-reduced image 60 generated by the camera C3, and the display system D1 is capable of deminiaturizing and/or visibly presenting the resulting substantially-reduced superimposed image substantially simultaneously and in real-time.

In use, the camera C1 and the camera C3 each is directed substantially toward one or more objects 40 (shown in FIG.

2) and creates a real-time initial image 50 (shown in FIG. 2) of the objects 40. The lens system 1210 of the camera C1 can be substantially directed toward objects 40 that are substantially the same as and/or different from the objects 40 toward which the lens system 1210 for the camera C3 is substantially directed. For each camera C1, C3, the optical signals 20 comprising the real-time initial image 50 are intensified to form the substantially-reduced image 60. The substantially-reduced image 60 of the camera C1 and the substantially-reduced image of the camera C3 are superimposed to form a substantially-reduced superimposed image. The substantially-reduced image 60 of the camera C1 and the substantially-reduced image of the camera C3 can be superimposed substantially adjacent to the proximal end region 1120 of the fiber optic cable 1100 such that one filament 1110 is used to communicate the substantially-reduced superimposed image. Alternatively, the substantially-reduced image 60 of camera C1 and the substantially-reduced image 60 of camera C3 each can be communicated to the distal end region 1130 of the fiber optic cable 1100 via separate filaments 1110 and can be superimposed substantially adjacent to the distal end region 1130. Upon receiving the substantially-reduced superimposed image, the lens system 1310 of the display system D1 deminiaturizes the substantially-reduced superimposed image and visibly presents an expanded superimposed image, comprising the deminiaturized substantially-reduced superimposed image, substantially simultaneously and in real-time.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A system for transmitting images over a single filament of a fiber optic cable, comprising:
   a first lens system for producing a substantially-reduced image of an object; and
   a second lens system for producing a visibly-presentable image of said object from said substantially-reduced image, said second lens system being optically coupled with said first lens system via said single filament of said fiber optic cable and being adapted to receive said substantially-reduced image from said first lens system via said single filament.

2. The system of claim 1, wherein said first lens system is optically coupled with said filament substantially adjacent to a proximal end region of staid fiber optic cable, and said second lens system is optically coupled with said filament substantially adjacent to a distal end region of said fiber optic cable.

3. The system of claim 1, wherein said first lens system comprises an optical portion of a camera.

4. The system of claim 1, wherein said first lens system includes an inverted microscope objective, said first lens system being optically coupled with said filament via said inverted microscope objective, said inverted microscope objective being adapted to produce said substantially-reduced image from an initial image generated by said first lens system.

5. The system of claim 4, wherein said inverted microscope objective is disposed substantially within said first lens system.

6. The system of claim 4, wherein said substantially-reduced image has a size that is substantially between one-thousandth and one-millionth of a size of said initial image.

7. The system of claim 1, wherein said first lens system is optically coupled with said filament via a collimating and focusing system.

8. The system of claim 1, wherein said second lens system comprises an optical portion of a projector.

9. The system of claim 1, wherein said second lens system includes a microscope objective, said second lens system being optically coupled with said filament via said microscope objective, said microscope objective being adapted to produce a restored image from said substantially reduced image.

10. The system of claim 9, wherein said microscope objective is disposed substantially within said second lens system.

11. The system of claim 9, wherein said restored image has a size that is substantially between one thousand and one million times of a size of said substantially-reduced image.

12. The system of claim 1, wherein said second lens system is optically coupled with said filament via a collimating and focusing system.

13. The system of claim 1, wherein said second lens system is adapted to visibly present said visibly-presentable image.

14. The system of claim 13, wherein said visibly-presentable image is visibly presented by being projected onto a viewing screen.

15. The system of claim 13, wherein said visibly-presentable image is visibly presented substantially adjacent to an image surface of said second lens system.

16. A system for transmitting images over a single filament of a fiber optic cable, comprising:
    a camera, said camera being coupled with a proximal end region of said fiber optic cable and having a lens system for receiving light from an object, said lens system being in optical communication with said single filament and being adapted to produce a substantially-reduced image of said object; and
    a display system, said display system being coupled with a distal end region of said fiber optic cable and having a lens system, said lens system of said display system being in optical communication with said lens system of said camera via said single filament and being adapted to produce a visibly-presentable image from said substantially-reduced image, said display system being capable of visibly presenting said visibly-presentable image.

17. The system of claim 16, wherein said camera includes an inverted microscope objective, said lens system of said camera being optically coupled with said filament via said inverted microscope objective, said inverted microscope objective being adapted to produce said substantially reduced image from an initial image generated by said lens system of said camera.

18. The system of claim 17, wherein said substantially-reduced image has a size that is substantially between one-thousandth and one-millionth of a size of said initial image.

19. The system of claim 16, wherein said display system includes a microscope objective, said lens system of said display system being optically coupled with said filament via said microscope objective, said microscope objective being adapted to produce a restored image from said substantially reduced image.

20. The system of claim 19, wherein said restored image has a size that is substantially between one thousand and one million times of a size of said substantially-reduced image.

21. A system for transmitting images over a filament of a fiber optic cable, comprising:
- a first lens system for producing an initial image of an object, said first lens system comprising an optical portion of a camera;
- an inverted microscope objective for producing a substantially-reduced image from said initial image, said inverted microscope objective being optically coupled with said first lens system and being adapted to receive said initial image from said first lens system, said substantially-reduced image having a size that is substantially between one-thousandth and one-millionth of a size of said initial image;
- a first collimating and focusing system for collimating and focusing said substantially-reduced image, said first collimating and focusing system being optically coupled with said inverted microscope objective and being adapted to receive said substantially-reduced image from said inverted microscope objective;
- a first optical coupler for optically coupling said first collimating and focusing system with said filament at a proximal end region of said fiber optic cable, said first optical coupler being adapted to receive said substantially-reduced image from said first collimating and focusing system and being capable of communicating said substantially-reduced image to said filament;
- a second optical coupler, said second optical coupler being optically coupled with said filament at a distal end region of said fiber optic cable and being adapted to receive said substantially-reduced image from said first optical coupler via said filament;
- a second collimating and focusing system for collimating and focusing said substantially-reduced image, said second collimating and focusing system being optically coupled with said second optical coupler and being adapted to receive said substantially-reduced image from said second optical coupler;
- a microscope objective for producing a restored image from said substantially-reduced image, said microscope objective being optically coupled with said second collimating and focusing system and being adapted to receive said substantially-reduced image from said second collimating and focusing system, said restored image having a size that is substantially between one thousand and one million times of said size of said substantially-reduced image; and
- a second lens system for producing a visibly-presentable image from said restored image, said second lens system comprising an optical portion of a projector, being optically coupled with said microscope objective, being adapted to receive said restored image from said microscope objective, and being capable of visibly presenting said visibly-presentable image.

22. A system for transmitting images over a fiber optic cable having a plurality of filaments, each filament for transmitting a whole image, comprising:
- a first plurality of lens systems each for producing a substantially-reduced image of an object, said first plurality of lens systems each being adapted to produce a substantially-reduced image of said object; and
- a second plurality of lens systems each for producing a visibly-presentable image of said object, said second plurality of lens systems each being optically coupled with at least one of said first plurality of lens systems via at least one of said plurality of filaments, each filament for transmitting a whole image, and each of said second plurality of lens systems being adapted to receive said substantially-reduced image from said at least one of said first plurality of lens systems via said at least one of said plurality of filaments.

23. The system of claim 22 wherein at least one of said first plurality of lens systems is optically coupled with said at least one of said plurality of filaments substantially adjacent to a proximal end region of said fiber optic cable, and at least one of said second plurality of lens systems is optically coupled with said at least one of said plurality of filaments substantially adjacent to a distal end region of said fiber optic cable.

24. The system of claim 22 wherein at least one of said first plurality of lens systems is optically coupled with said at least one of said plurality of filaments substantially adjacent to a distal end region of said fiber optic cable, and at least one of said second plurality of lens systems is optically coupled with said at least one of said plurality of filaments substantially adjacent to a proximal end region of said fiber optic cable.

25. The system of claim 22, wherein at least one of said first plurality of lens systems comprises an optical portion of a camera.

26. The system of claim 22, wherein at least one of said first plurality of lens systems includes an inverted microscope objective, said at least one of said first plurality of lens systems each being optically coupled with at least one of said plurality of filaments via said inverted microscope objective, said inverted microscope objective each being adapted to produce said substantially-reduced image from an initial image generated by said at least one of said first plurality of lens systems.

27. The system of claim 26, wherein said substantially-reduced image has a size that is substantially between one-thousandth and one-millionth of a size of said initial image.

28. The system of claim 22, wherein at least one of said second plurality of lens systems comprises au optical portion of a projector.

29. The system of claim 22, wherein at least one of said second plurality of lens systems includes a microscope objective, said at least one of said second plurality of lens systems each being optically coupled with said at least one of said plurality of filaments via said microscope objective, said microscope objective each being adapted to produce a restored image from said substantially reduced image.

30. The system of claim 22, wherein said restored image each has a size that is substantially between one thousand and one million tunes of a size of said substantially-reduced image.

31. A method of manufacturing a system for transmitting images over a single filament of a fiber optic cable, comprising the steps of:
- optically coupling a first lens system with said single filament, said first lens system being adapted to receive light from an object and to produce a substantially-reduced image of said object; and
- optically coupling a second lens system with said single filament, said second lens system being adapted to receive said substantially-reduced image from said first lens system via said single filament, to produce a visibly-presentable image of said object from said substantially-reduced image, and to visibly present said visibly-presentable image.

32. The method of claim 31, wherein said first step of optically coupling comprises the step of optically coupling said first lens system with said filament via an inverted microscope objective, said inverted microscope objective being adapted to produce said substantially-reduced image from an initial image generated by said first lens system.

33. The method of claim 31, wherein said first step of optically coupling comprises the step of optically coupling said first lens system with said filament via an optical coupler.

34. The method of claim 31, wherein said first step of optically coupling comprises the step of optically coupling said first lens system with said filament via a collimating and focusing system.

35. The method of claim 31, wherein said second step of optically coupling comprises the step of optically coupling said second lens system with said filament via a microscope objective, said microscope objective being adapted to produce a restored image from said substantially-reduced image.

36. The method of claim 31, wherein said second step of optically coupling comprises the step of optically coupling said second lens system with said filament via an optical coupler.

37. The method of claim 31, wherein said second step of optically coupling comprises the step of optically coupling said second lens system with said filament via a collimating and focusing system.

38. A method for transmitting images over a single filament of a fiber optic cable, comprising:

producing a substantially-reduced image of an object via a first lens system;

communicating said substantially-reduced image from said first lens system to a second lens system via said single filament; and generating a visibly-presentable image from said substantially-reduced image via said second lens system.

39. The method of claim 38, wherein said step of producing comprises the steps of generating an initial image of said object via said first lens system and producing said substantially-reduced image from said initial image via an inverted microscope objective, said inverted microscope objective optically coupling said first lens system with said filament.

40. The method of claim 39, wherein said step of producing said substantially-reduced image from said initial image via an inverted microscope objective comprises the step of generating said substantially-reduced image with a size that is substantially between one-thousandth and one-millionth of a size of said initial image.

41. The method of claim 38, wherein said step of communicating includes the step of collimating and focusing said substantially-reduced image.

42. The method of claim 38, wherein said step of generating comprises the steps of generating a restored image from said substantially-reduced image via a microscope objective and producing said visibly-presentable image from said restored image via said second lens system, said microscope objective optically coupling said filament with said second lens system.

43. The method of claim 42, wherein said step of producing comprises the step of generating said restored image with a size that is substantially between one thousand and one million times a size of said substantially-reduced image.

44. The method of claim 38, wherein said step of producing includes the step of visibly presenting said visibly-presentable image.

45. The method of claim 44, wherein the step of visibly presenting comprises the step of projecting said visibly-presentable image on a viewing screen.

46. The method of claim 44, wherein the step of visibly presenting comprises the step of visibly presenting said visibly-presentably image substantially adjacent to an image surface of said second lens system.

* * * * *

UNITED STATES PATENT AND TRADEMARK OFFICE
CERTIFICATE OF CORRECTION

PATENT NO. : 6,718,103 B2
DATED : April 6, 2004
INVENTOR(S) : Aluizio M. Cruz

It is certified that error appears in the above-identified patent and that said Letters Patent is hereby corrected as shown below:

Column 21,
Line 25, delete the hyphen after the word "converging".

Column 35,
Line 52, change the word "staid" to -- said --.

Column 36,
Line 55, add a hyphen after the word "substantially".

Column 38,
Line 41, change the word "au" to -- an --.
Line 52, change the word "tunes" to -- times --.

Signed and Sealed this

Seventh Day of September, 2004

JON W. DUDAS
*Director of the United States Patent and Trademark Office*